US012034254B2

(12) United States Patent
Maesoba et al.

(10) Patent No.: US 12,034,254 B2
(45) Date of Patent: Jul. 9, 2024

(54) CONNECTOR, AND CONNECTOR STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 356 days.

(21) Appl. No.: 17/417,028

(22) PCT Filed: Dec. 18, 2019

(86) PCT No.: PCT/JP2019/049562
§ 371 (c)(1),
(2) Date: Jun. 21, 2021

(87) PCT Pub. No.: WO2020/137732
PCT Pub. Date: Jul. 2, 2020

(65) Prior Publication Data

US 2022/0077635 A1 Mar. 10, 2022

(30) Foreign Application Priority Data

Dec. 28, 2018 (JP) ................................ 2018-247601

(51) Int. Cl.
*H01R 13/648* (2006.01)
*H01R 13/502* (2006.01)
(Continued)

(52) U.S. Cl.
CPC ....... *H01R 13/6582* (2013.01); *H01R 13/502* (2013.01); *H01R 13/6593* (2013.01)

(58) Field of Classification Search
CPC .............. H01R 13/502; H01R 13/6582; H01R 13/6593; H01R 13/50; H01R 13/46
(Continued)

(56) References Cited

U.S. PATENT DOCUMENTS 7,083,472 B2 * 8/2006 Gordon .............. H01R 13/6599 439/607.41
7,249,974 B2 * 7/2007 Gordon .............. H01R 13/6593 439/607.41
(Continued)

FOREIGN PATENT DOCUMENTS

JP 2012-195315 A 10/2012

OTHER PUBLICATIONS

International Search Report dated Mar. 3, 2020 for WO 2020/137732 A1 (4 pages).

*Primary Examiner* — Abdullah A Riyami
*Assistant Examiner* — Vladimir Imas
(74) *Attorney, Agent, or Firm* — Venjuris, P.C.

(57) ABSTRACT

A female connector to be connected to an end part of such a shielded cable is provided with female terminals to be connected to cores, an insulating dielectric, a first outer conductor including a tubular portion, a connection plate portion to be overlapped on the braided wire and a first coupling portion coupling the tubular portion and the connection plate portion, and a second outer conductor including a rear crimping portion and the connection plate portion
(Continued)

from outside the braided wire and the connection plate portion, a front crimping portion to be connected to the tubular portion from outside the tubular portion and a second coupling portion. The outer peripheries of the cores are surrounded by the first and second coupling portions with the second coupling portion at least partially overlapped on the outside of the first coupling portion.

10 Claims, 30 Drawing Sheets

(51) Int. Cl.
*H01R 13/6582* (2011.01)
*H01R 13/6593* (2011.01)

(58) Field of Classification Search
USPC ..................................................... 439/607.01
See application file for complete search history.

(56) References Cited

U.S. PATENT DOCUMENTS

| | | | | |
|---|---|---|---|---|
| 7,510,439 | B2 * | 3/2009 | Gordon .............. | H01R 13/6589 439/607.41 |
| 8,998,641 | B2 | 4/2015 | Kanda | |
| 10,511,116 | B2 * | 12/2019 | Maesoba ............ | H01R 13/4364 |
| 10,741,977 | B2 * | 8/2020 | Maesoba .............. | H01R 13/502 |
| 10,833,444 | B2 * | 11/2020 | Maesoba .............. | H01R 13/502 |
| 10,910,733 | B2 | 2/2021 | Miyamoto et al. | |
| 2005/0277340 | A1 * | 12/2005 | Gordon ................ | H01R 9/0512 439/676 |
| 2013/0023155 | A1 * | 1/2013 | Il ........................ | H01R 13/6593 439/607.27 |
| 2019/0013614 | A1 | 1/2019 | Matsui et al. | |
| 2022/0115822 | A1 * | 4/2022 | Maesoba .......... | H01R 13/65912 |

* cited by examiner

CONNECTOR, AND CONNECTOR STRUCTURE

CROSS REFERENCE TO RELATED APPLICATIONS

This application is a national phase of PCT application No. PCT/JP2019/049562, filed on 18 Dec. 2019, which claims priority from Japanese patent application No. 2018-247601, filed on 28 Dec. 2018, all of which are incorporated herein by reference.

TECHNICAL FIELD

A technique disclosed in this specification concerns a technique relating to a connector to be connected to an end of a shielded cable.

BACKGROUND

A connector to be connected to an end of a shielded cable is known from Japanese Patent Laid-Open Publication No. 2014-002974. The shielded cable is configured such that the outer periphery of a coated wire including a core and an insulation coating surrounding the outer periphery of the core is further surrounded by a shield portion. The connector includes an inner conductor to be connected to the core, an insulating dielectric for covering the inner conductor, an outer conductor for covering the dielectric and a crimping member to be crimped to the outer conductor and the shield portion.

The outer conductor includes a connection piece, the connection piece is disposed inside the shield portion, and the crimping member is crimped to the connection piece and the shield portion from outside the shield portion. In this way, the shield portion and the connection piece are electrically connected.

PRIOR ART DOCUMENT

Patent Document

Patent Document 1: JP 2014-002974 A

SUMMARY OF THE INVENTION

Problems to be Solved

In the above connector, a clearance is formed between the outer conductor and the crimping member. The core of the shielded cable is exposed to outside from the shield portion and the outer conductor through this clearance. Thus, there is a concern that noise generated from the core leaks to the outside through the clearance or external noise enters the core through the clearance.

The technique disclosed in this specification was completed on the basis of the above situation and aims to provide a technique relating to a connector with improved shielding performance.

Means to Solve the Problem

The technique disclosed in this specification is directed to a connector to be connected to an end part of a shielded cable configured such that an outer periphery of a coated wire including a core and an insulation coating surrounding an outer periphery of the core is surrounded by a shield portion, the connector including an inner conductor to be connected to the core, an insulating dielectric for surrounding the inner conductor, a first outer conductor including a tubular portion for surrounding the dielectric, a connection plate portion to be overlapped on the shield portion and a first coupling portion coupling the tubular portion and the connection plate portion, and a second outer conductor including a shield crimping portion to be crimped to the shield portion and the connection plate portion from outside the shield portion and the connection plate portion, a tube crimping portion to be connected to the tubular portion from outside the tubular portion and a second coupling portion coupling the shield crimping portion and the tube crimping portion, wherein the outer periphery of the core is surrounded by the first and second coupling portions with the second coupling portion at least partially overlapped on the outside of the first coupling portion.

The technique disclosed in this specification is also directed to a connector structure with a shielded cable configured such that an outer periphery of a coated wire including a core and an insulation coating surrounding an outer periphery of the core is surrounded by a shield portion, an inner conductor to be connected to the core exposed from an end part of the shielded cable, an insulating dielectric for surrounding the inner conductor, a first outer conductor including a tubular portion for surrounding the dielectric, a connection plate portion to be overlapped on the shield portion and a first coupling portion coupling the tubular portion and the connection plate portion, and a second outer conductor including a shield crimping portion to be crimped to the shield portion and the connection plate portion from outside the shield portion and the connection plate portion, a tube crimping portion to be connected to the tubular portion from outside the tubular portion and a second coupling portion coupling the shield crimping portion and the tube crimping portion, wherein the outer periphery of the core is surrounded by the first and second coupling portions with the second coupling portion at least partially overlapped on the outside of the first coupling portion.

According to the above configurations, a clearance formed between the first and second coupling portions can be reduced in a part where the second coupling portion is overlapped on the outside of the first coupling portion. In this way, noise generated to outside from the core or noise entering the core from outside can be suppressed. In this way, the shielding performance of the connector can be improved.

The following modes are preferable as embodiments of the technique disclosed in this specification.

In the part where the second coupling portion is overlapped on the outside of the first coupling portion, an inner surface of the second coupling portion is formed along an outer surface of the first coupling portion.

According to the above configuration, the clearance formed between the first and second coupling portions can be further reduced. Thus, the shielding performance of the connector can be further improved.

In the part where the second coupling portion is overlapped on the outside of the first coupling portion, the inner surface of the second coupling portion is in close contact with the outer surface of the first coupling portion.

According to the above configuration, noise generated to outside from the core or noise entering the core from outside can be reliably suppressed. In this way, the shielding performance of the connector can be reliably improved.

Effect of the Invention

According to the technique disclosed in this specification, shielding performance can be improved.

DETAILED DESCRIPTION TO EXECUTE THE INVENTION

First Embodiment

Figure 1:
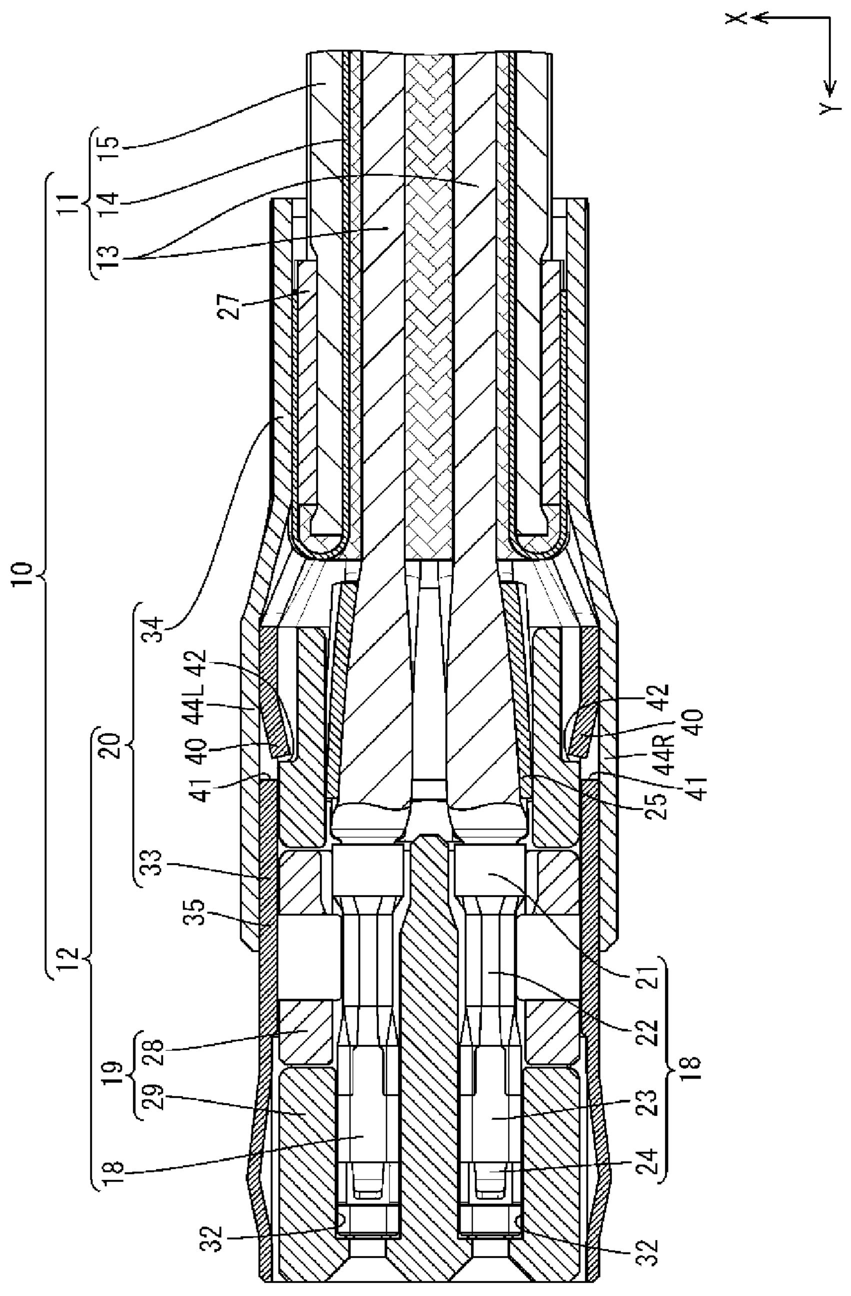
FIG. 1 is a section showing a female connector structure according to a first embodiment.
Figure 2:
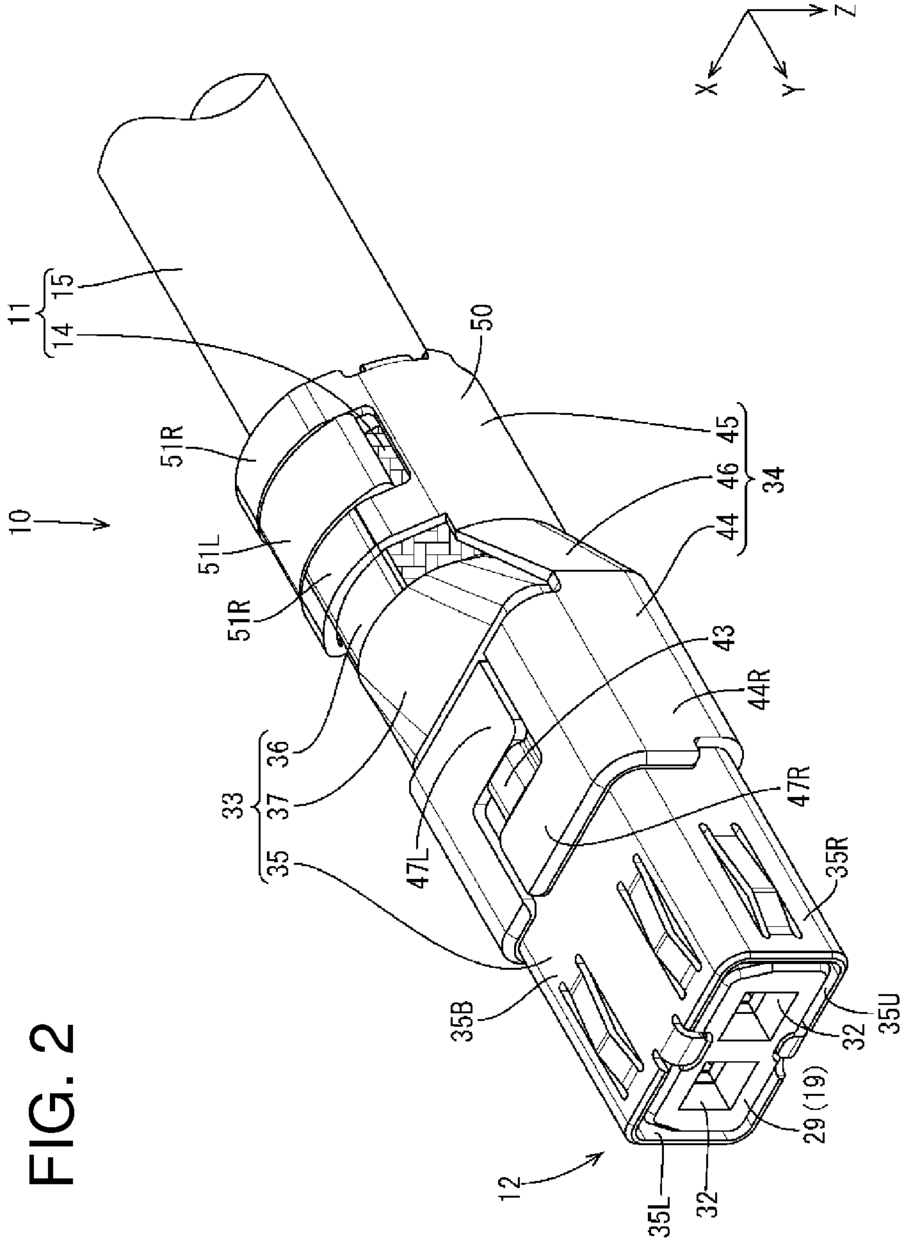
FIG. 2 is a perspective view showing the female connector structure.

A first embodiment in which the technique disclosed in this specification is applied to a female connector structure 10 (example of a connector structure) is described with reference to FIGS. 1 to 16. In the female connector structure 10 according to this embodiment, a female connector 12 (example of a connector) is connected to an end of a shielded cable 11. In the following description, a Z direction, a Y direction and an X direction are respectively referred to as an upward direction, a forward direction and a leftward direction. Only some of a plurality of members may be denoted by a reference sign and the other members may not be denoted by the reference sign.

[Shielded Cable 11]

The shielded cable 11 is configured such that the outer peripheries of a plurality of (two in this embodiment) coated wires 13 are surrounded by a braided wire 14 (example of a shield portion) made of thin metal wires and the outer periphery of the braided wire 14 is surrounded by a sheath 15 made of an insulating material. Each coated wire 13 includes a core 16 and an insulation coating 17 surrounding the outer periphery of the core 16. An arbitrary metal such as copper, copper alloy, aluminum or aluminum alloy can be selected as a metal constituting the core 16 according to need. The core 16 may be formed by one metal strand or may be formed by a stranded wire formed by twisting a plurality of metal strands. The insulation coatings 17 and the sheath 15 are made of insulating synthetic resin.

An end processing such stripping is applied to an end of the shielded cable 11 to expose an end of each of the cores 16, the insulation coatings 17 and the braided wire 14.

[Female Connector 12]

The female connector 12 includes female terminals 18 (example of an inner conductor), an insulating dielectric 19 for surrounding the outer peripheries of the female terminals 18 and an outer conductor 20 for surrounding the outer periphery of the dielectric 19. The outer conductor 20 includes a first outer conductor 33 and a second outer conductor 34 electrically connected to the first outer conductor 33.

[Female Terminals 18]

The female terminal 18 is formed by press-working a metal plate material into a predetermined shape. An arbitrary metal such as copper, copper alloy, aluminum or aluminum alloy can be selected as a metal constituting the female terminal 18 according to need. The female terminal 18 is connected to the end of each coated wire 13. The female terminal 18 includes an insulation barrel 21 to be crimped to wind around the outer periphery of the insulation coating 17 of the coated wire 13, a wire barrel 22 connected in front of the insulation barrel 21 and to be crimped to wind around the outer periphery of the core 16, and a connection tube portion 23 connected in front of the wire barrel 22, an unillustrated mating terminal being inserted into the connection tube portion 23. A resilient contact piece 24 is disposed in the connection tube portion 23. By inserting the mating terminal into the connection tube portion 23, the mating terminal and the resilient contact piece 24 are resiliently brought into contact, whereby the mating terminal and the female terminal 18 are electrically connected.

[Clip 25]

Figure 6:
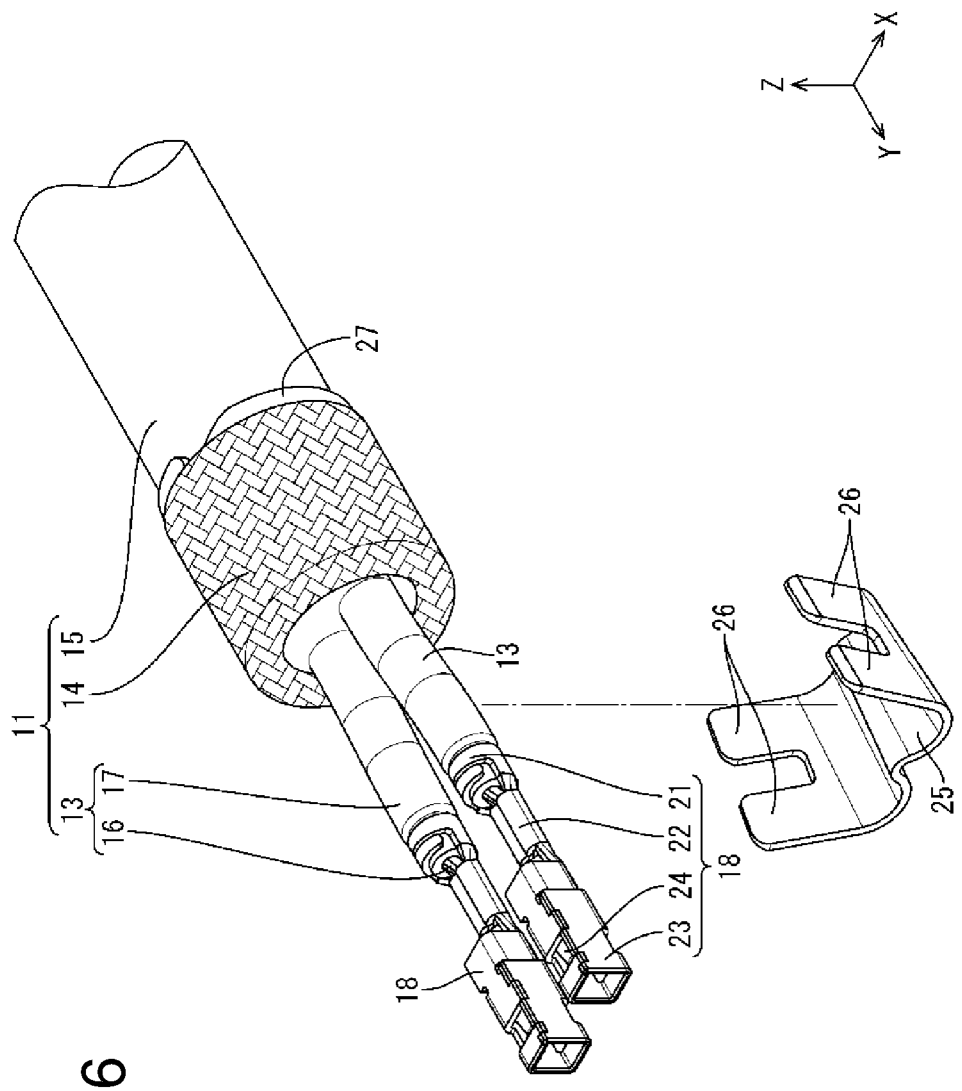
FIG. 6 is a perspective view showing a step of externally fitting a clip to insulation coatings.

As shown in FIG. 6, two coated wires 13 drawn out from the end of the sheath 15 are held by one clip 25. The clip 25 is formed by press-working a metal plate material into a predetermined shape. The clip 25 is substantially W-shaped when viewed from a front-rear direction. The clip 25 is crimped to wind around the outer peripheries of the insulation coatings 17 of the respective coated wires 13. The clip 25 includes crimping pieces 26 arranged at a distance in the front-rear direction. By crimping the crimping pieces 26 of the clip 25 to the two coated wires 13, relative positions of the two coated wires 13 are held.

[Braided Wire 14]

The braided wire 14 is formed by braiding a plurality of metal thin wires into a tube. A part of the braided wire 14 exposed from the end of the sheath 15 is folded toward the end of the sheath 15 and overlapped on the outside of the sheath 15.

[Sleeve 27]

Figure 3:
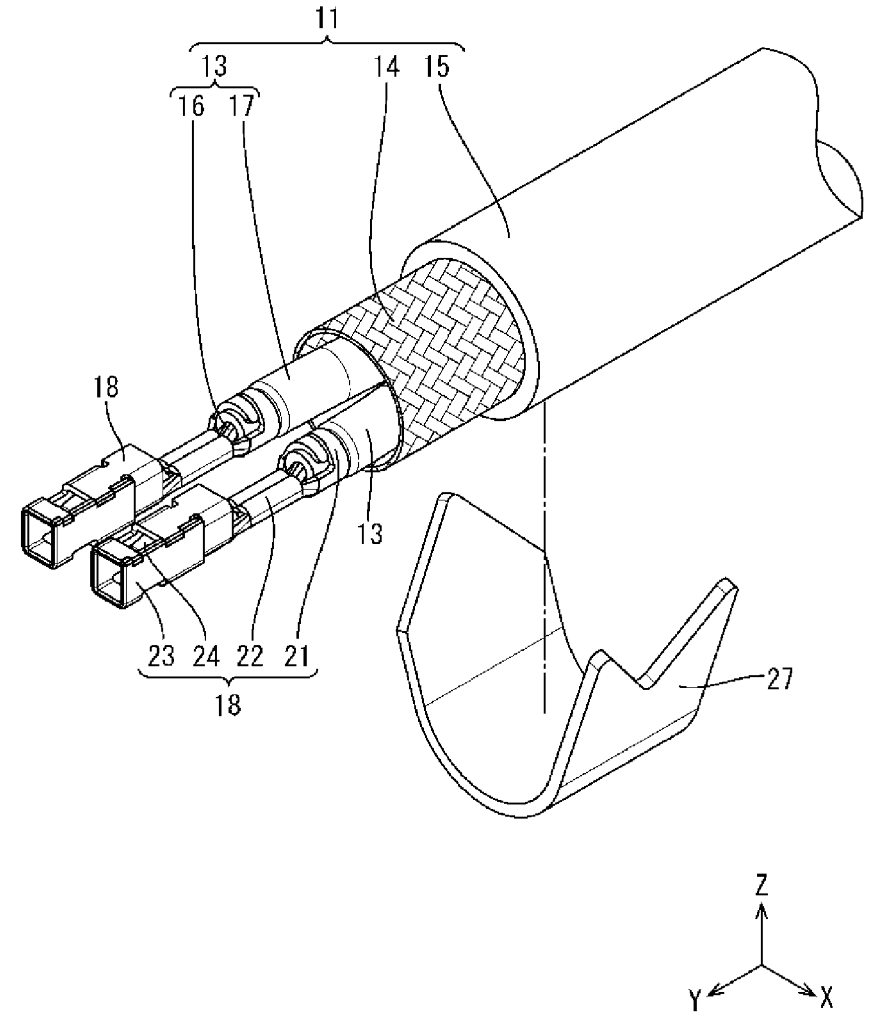
FIG. 3 is a perspective view showing a step of externally fitting a sleeve to a sheath of a shielded cable.
Figure 4:
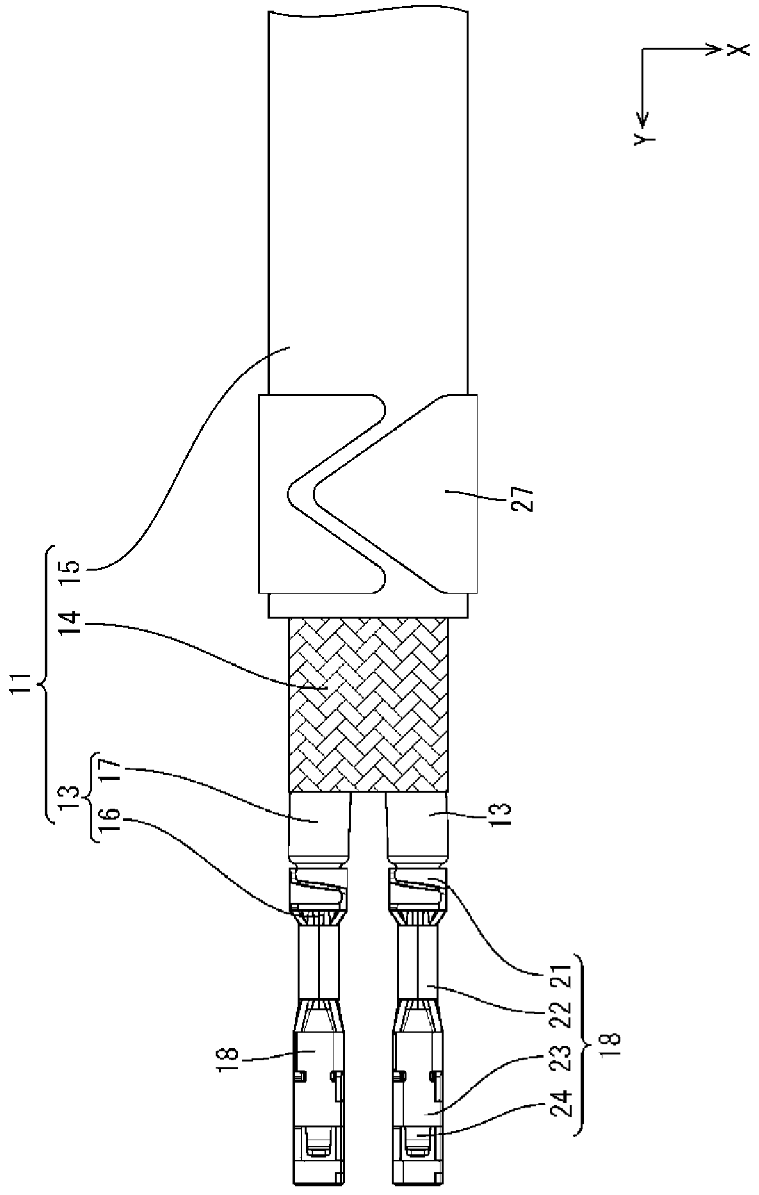
FIG. 4 is a plan view showing a state where the sleeve is externally fit to the sheath of the shielded cable.
Figure 5:
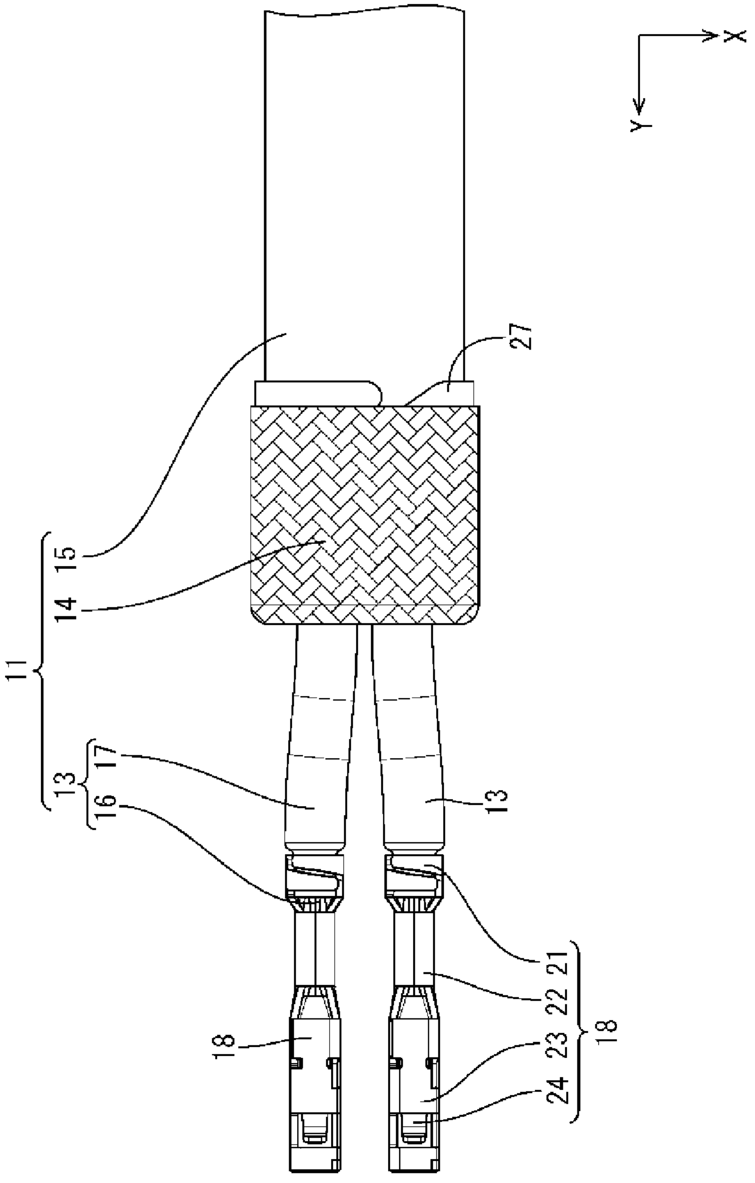
FIG. 5 is a plan view showing a state where a braided wire is folded on the sleeve.

As shown in FIGS. 3 to 5, a sleeve 27 is crimped to wind around the outer periphery of the sheath 15 outside the end of the sheath 15 and inside the braided wire 14 overlapped on the end of the sheath 15. The sleeve 27 is formed by press-working a metal plate material into a predetermined shape. The sleeve 27 is in the form of an elongated plate. One of longitudinal end parts of the sleeve 27 has a crest shape and the other has a trough shape when viewed laterally. The sleeve 27 is crimped to the outer periphery of the sheath 15 with the both end parts of the sleeve 27 facing each other across a clearance.

[Dielectric 19]

Figure 7:
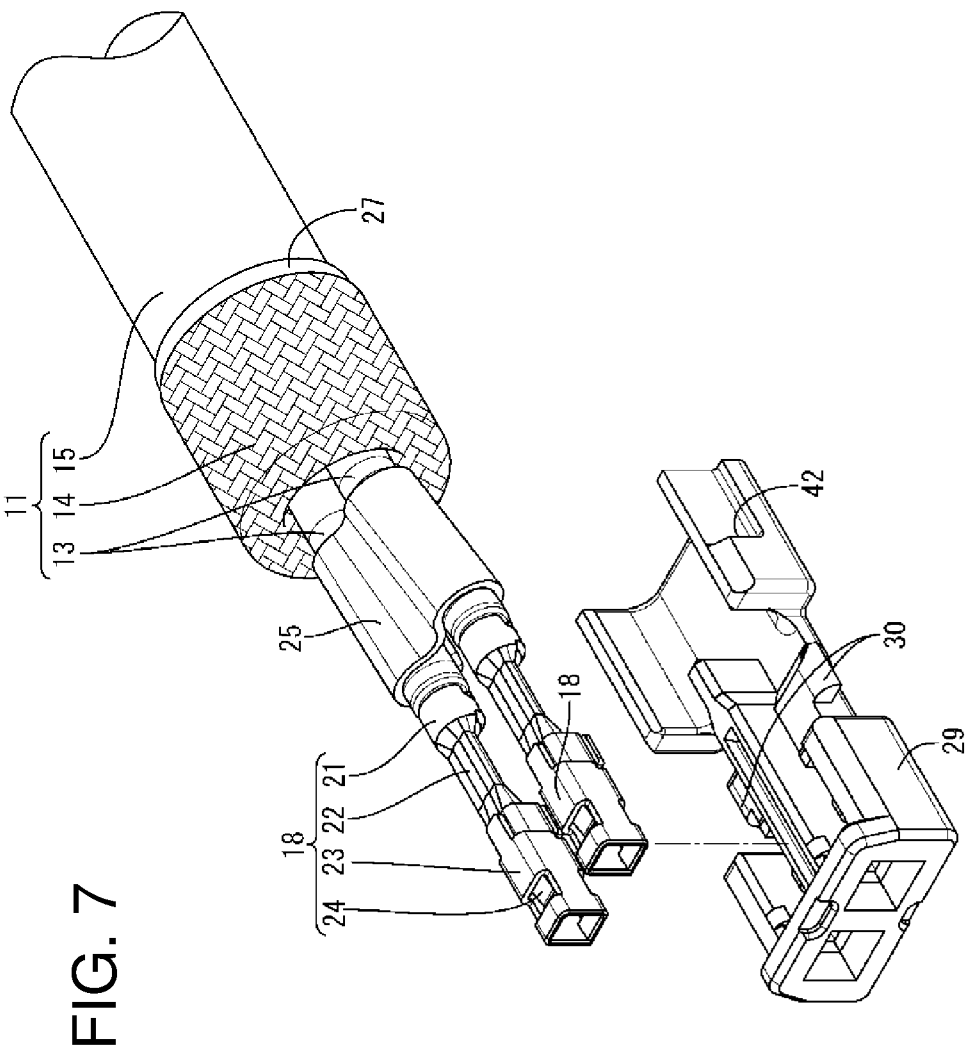
FIG. 7 is a perspective view showing a step of placing female terminals on an upper dielectric.
Figure 8:
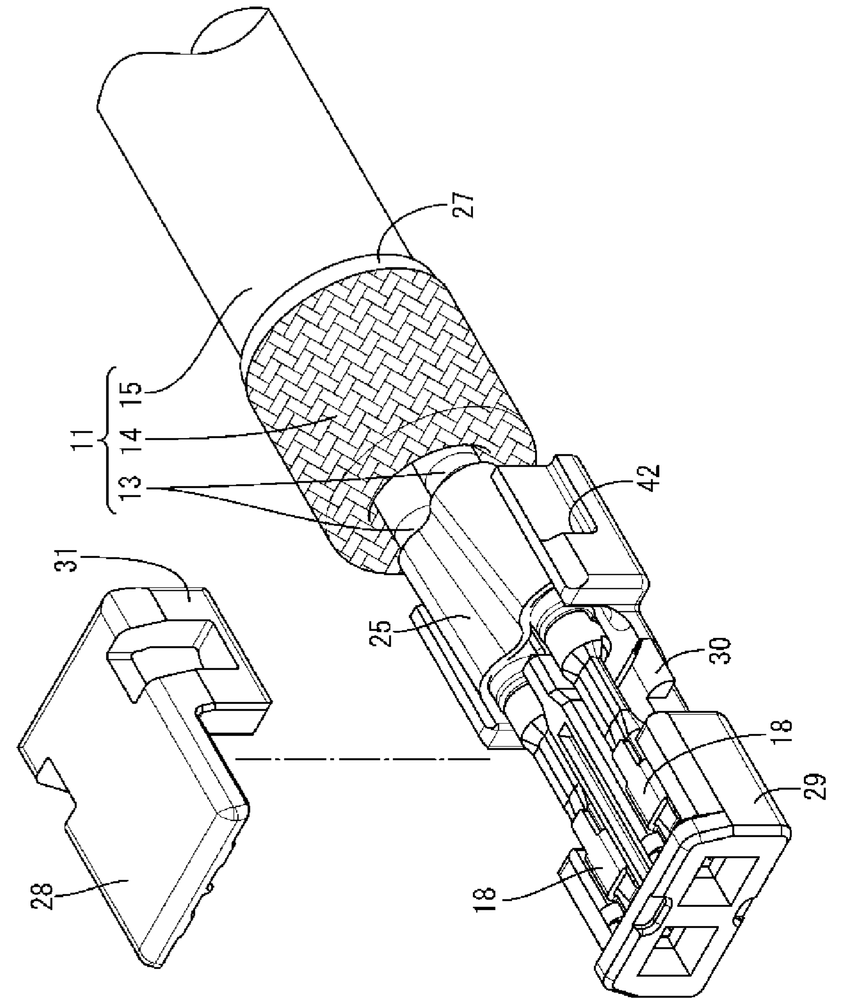
FIG. 8 is a perspective view showing a step of assembling the upper dielectric and a lower dielectric.
Figure 9:
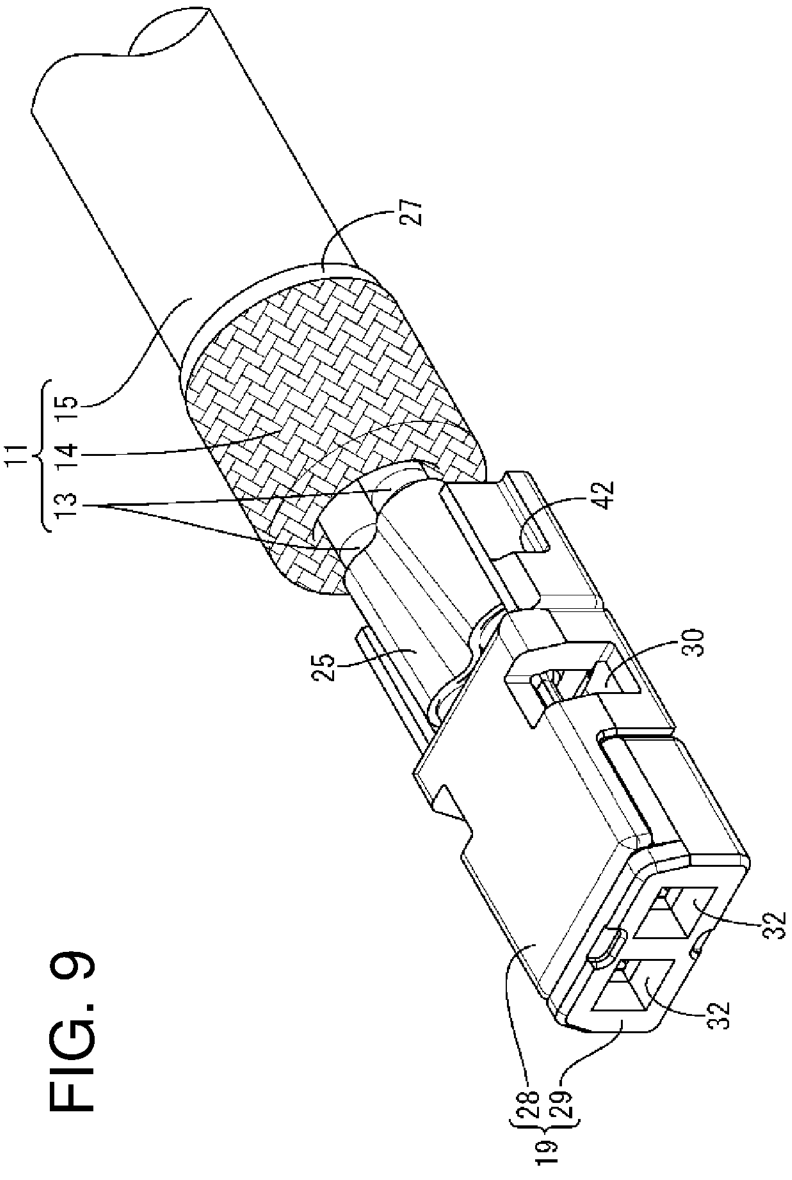
FIG. 9 is a perspective view showing a state where the upper and lower dielectrics are assembled.

As shown in FIGS. 7 to 9, the female terminals 18 are surrounded by the dielectric 19. The dielectric 19 is in the form of a rectangular parallelepiped extending in the front-rear direction as a whole. The dielectric 19 includes a lower dielectric 28 open upward and arranged on a lower side and an upper dielectric 29 to be assembled with the lower dielectric 28 from above. The lower and upper dielectrics 28, 29 are formed by injection-molding an insulating synthetic resin. The lower and upper dielectrics 28, 29 are integrally assembled by resiliently locking lock claws 30 projecting outward from side edges of the upper dielectric 29 and resiliently deformable lock receiving portions 31 formed at positions of the lower dielectric 28 corresponding to the lock claws 30. The lock receiving portions 31 are substantially gate-shaped. With the lower and upper dielectrics 28, 29 assembled, cavities 32 for accommodating the female terminals 18 are formed to extend in the front-rear direction in the dielectric 19. In this embodiment, a plurality of (two in this embodiment) the cavities 32 are formed side by side in a lateral direction.

[First Outer Conductor 33]

Figure 10:
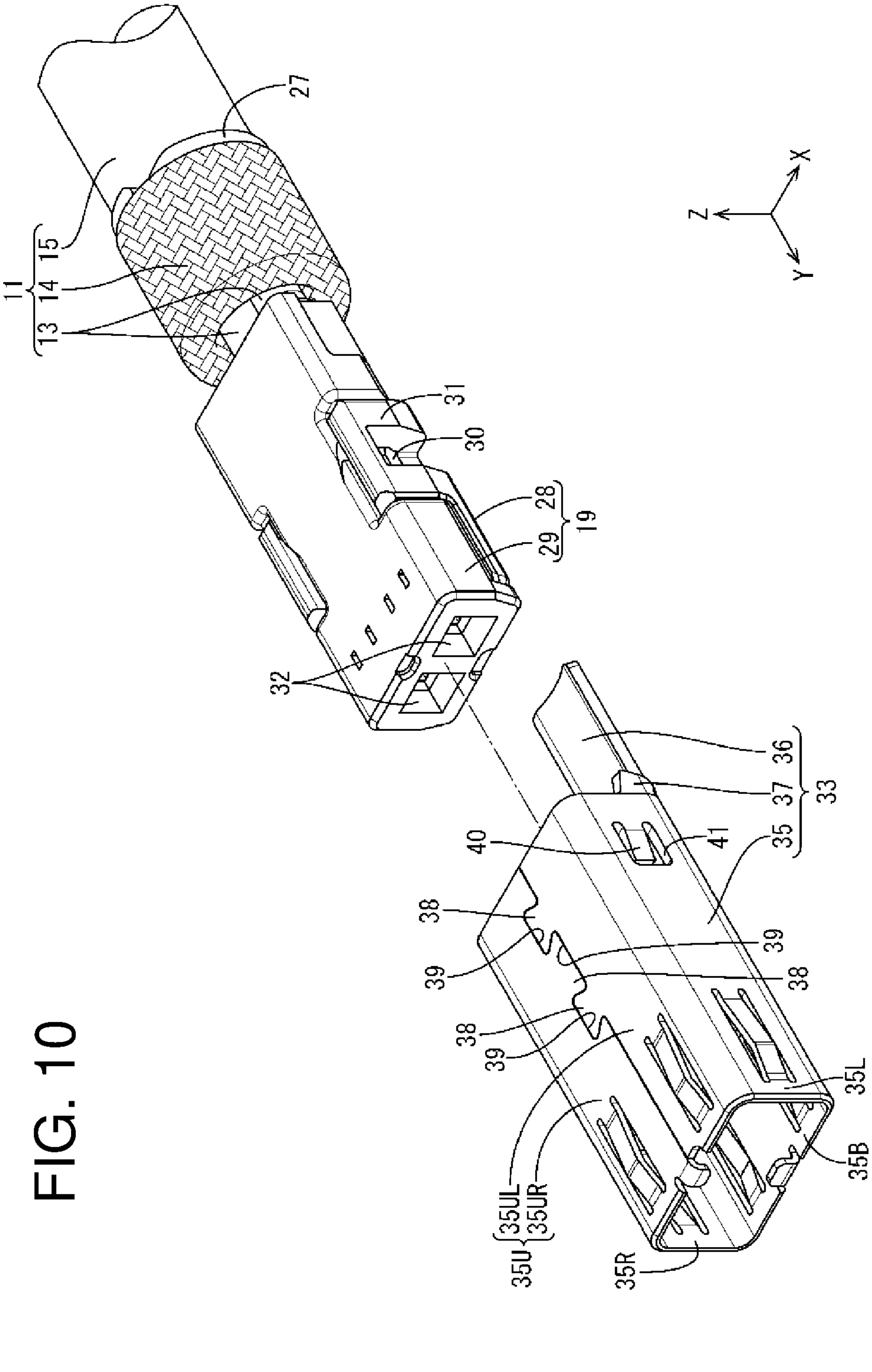
FIG. 10 is a perspective view showing a step of inserting a dielectric into a tubular portion of a first outer conductor.
Figure 14:
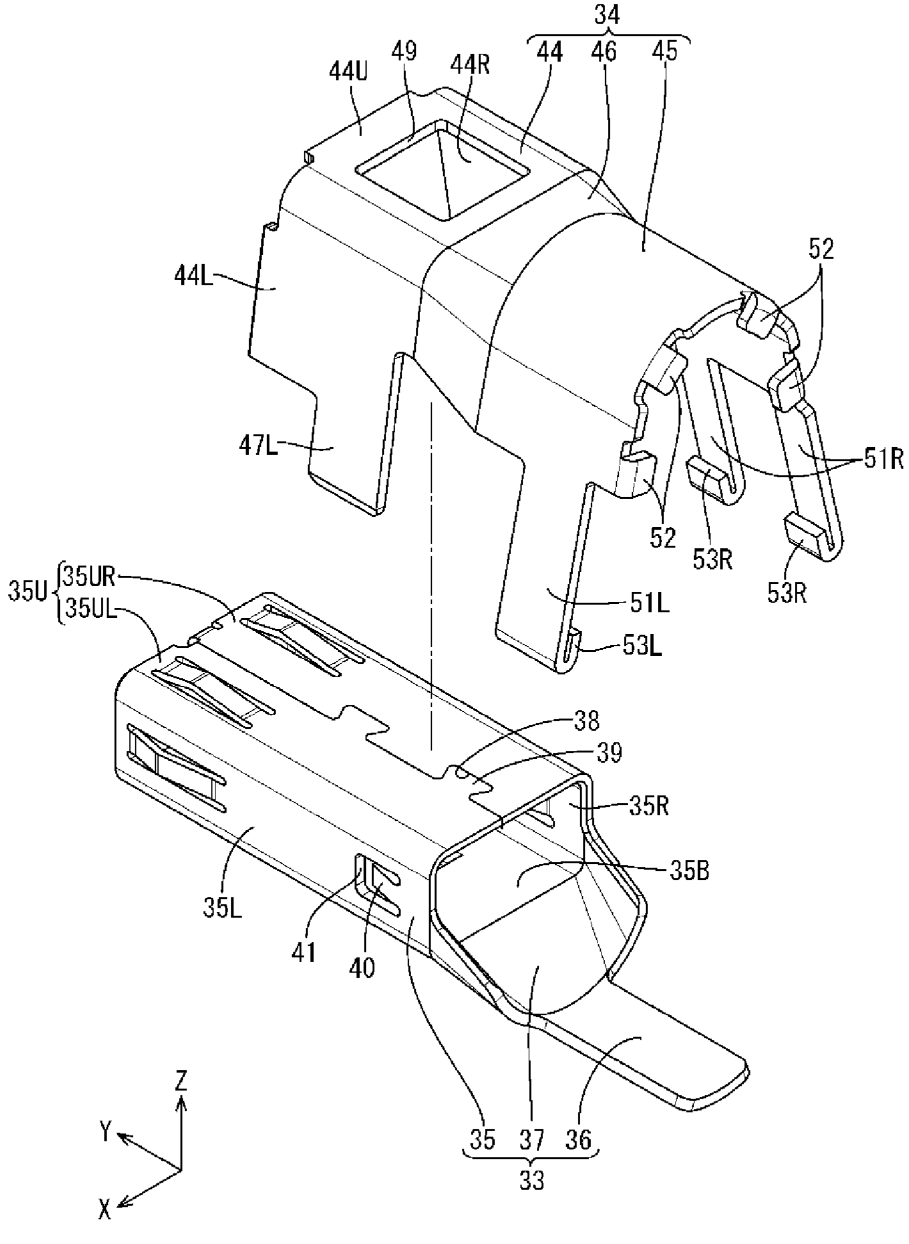
FIG. 14 is an exploded perspective view showing the first and second outer conductors.

As shown in FIGS. 10 and 14, the first outer conductor 33 is formed by press-working a metal plate material into a predetermined shape. An arbitrary metal such as copper, copper alloy, aluminum or aluminum alloy can be selected as a metal constituting the first outer conductor 33 according to need. The first outer conductor 33 includes a tubular portion 35 in the form of a rectangular tube extending in the front-rear direction, a connection plate portion 36 disposed behind the tubular portion 35, in the form of an elongated plate extending in the front-rear direction and to be overlapped on the braided wire 14 folded on the outer periphery of the sheath 15, and a first coupling portion 37 coupling the tubular portion 35 and the connection plate portion 36 in the front-rear direction.

The inner shape of the tubular portion 35 is the same as or somewhat larger than the outer shape of the dielectric 19. The dielectric 19 is inserted into the tubular portion 35 from behind. The tubular portion 35 includes a bottom wall 35B, a left side wall 35L extending upward from the left side edge of the bottom wall 35B, a right side wall 35R extending upward from the right side edge of the bottom wall 35B and an upper wall 35U. The upper wall 35U is so formed that the right end edge of a left half 35UL extending rightward from the upper end edge of the left side wall 35L and the left end edge of a right half 35UR extending leftward from the upper end edge of the right side wall 35R butt against each other near a center in the lateral direction. Each of the right end edge of the left half 35UL and the left end edge of the right half 35UR is formed with substantially trapezoidal projection(s) 38 and substantially trapezoidal recess(es) 39, and the opening deformation of the tubular portion 35 is suppressed by fitting the projections 38 and the recesses 39.

Locking pieces 40 extending in the front-rear direction and cantilevered forward with rear end parts as base parts are formed at positions near the rear end parts of the left and right side walls 35L, 35R of the tubular portion 35. The locking pieces 40 are formed to extend laterally inward toward a front side. Through holes 41 left by cutting and raising the locking pieces 40 from the left and right side walls 35L, 35R are formed near the locking pieces 40. The locking pieces 40 are formed to be resiliently deformable in the lateral direction. The dielectric 19 is retained and held in the tubular portion 35 by locking front end parts of the locking pieces 40 to locking recesses 42 formed at positions near a rear end part of the dielectric 19 from behind.

The bottom wall 35B of the tubular portion 35 is formed with a mark 43 projecting downward at a position somewhat forward of the locking pieces 40 and the through holes 41 and near a lateral center. The mark 43 is formed by striking the bottom wall 35B of the tubular portion 35 downward.

The first coupling portion 37 extending obliquely downward to a rear side is formed on the rear end edge of the bottom wall 35B of the tubular portion 35, a substantially half region of the rear end edge of the left side wall 35L of the tubular portion 35 from below and a substantially half region of the rear end edge of the right side wall 35R of the tubular portion 35 from below. The first coupling portion 37 has a curved surface shape convex downward when viewed from behind.

The connection plate portion 36 extending rearward from the vicinity of the lateral center is formed on the rear end edge of the first coupling portion 37. The connection plate portion 36 is in the form of a plate elongated in the front-rear direction. The upper and lower surfaces of the connection plate portion 36 have a gentle arc shape convex downward.

[Second Outer Conductor 34]

Figure 13:
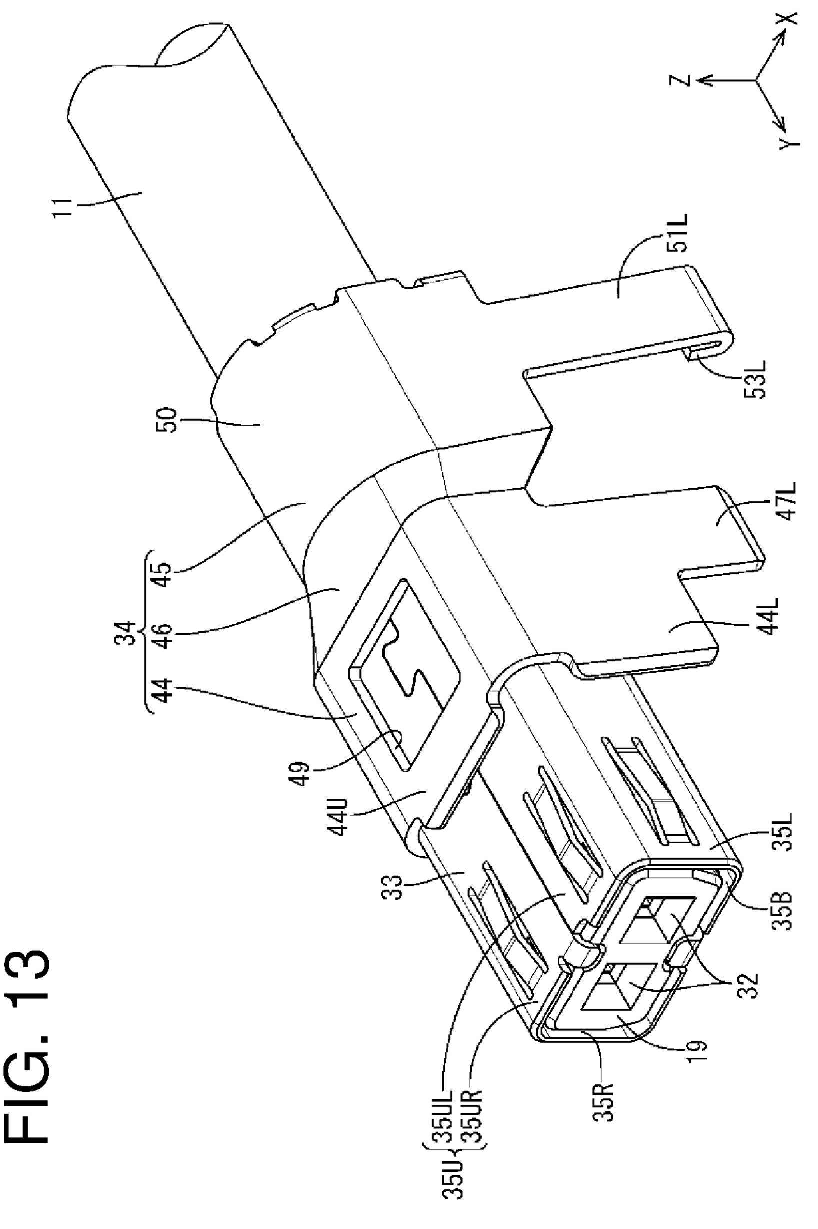
FIG. 13 is a perspective view showing the step of connecting the first and second outer conductors.

As shown in FIGS. 13 and 14, the second outer conductor 34 is formed by press-working a metal plate material into a predetermined shape. An arbitrary metal such as copper, copper alloy, aluminum or aluminum alloy can be selected as a metal constituting the second outer conductor 34 according to need. The second outer conductor 34 includes a front crimping portion 44 (example of a tube crimping portion) to be crimped to the outer periphery of the tubular portion 35, a rear crimping portion 45 (example of a shield crimping portion) to be crimped to the braided wire 14 folded on the end of the sheath 15 and the connection plate portion 36 overlapped on the braided wire 14, and a second coupling portion 46 coupling the front and rear crimping portions 44, 45 in the front-rear direction.

The front crimping portion 44 includes an upper wall 44U, a left side wall 44L extending downward from the left side edge of the upper wall 44U, a right side wall 44R extending downward from the right side edge of the upper wall 44U, a left crimping piece 47L extending rightward from a part near a rear end part, out of the lower end edge of the left side wall 44L, and a right crimping piece 47R extending rightward from a part near a front end part, out of the lower end edge of the right side wall 44R. With the front crimping portion 44 crimped to the outer periphery of the tubular portion 35, the upper wall 44U of the front crimping portion 44 covers the upper wall 35U of the tubular portion 35 from above, the left side wall 44L of the front crimping portion 44 covers the left side wall 35L of the tubular portion 35 from left, the right side wall 44R of the front crimping portion 44 covers the right side wall 35R of the tubular portion 35 from right, and the left and right crimping pieces 47L, 47R of the front crimping portion 44 cover the bottom wall 35B of the tubular portion 35 from below.

A clearance 48 is formed in the front-rear direction between the left and right crimping pieces 47L, 47R of the front crimping portion 44. A width in the front-rear direction of this clearance 48 is equal to or somewhat larger than that of the mark 43 of the tubular portion 35.

The front end edge of the left crimping piece 47L can come into contact with the rear end edge of the mark 43 from behind. Further, the rear end edge of the right crimping piece 47R can come into contact with the front end edge of the mark 43 from front. In this way, the tubular portion 35 and the front crimping portion 44 are positioned in the front-rear direction.

A locking hole 49 having a substantially rectangular shape when viewed from above penetrates through the upper wall 44U of the front crimping portion 44. A locking lance of an unillustrated connector housing is locked to a hole edge part of this locking hole 49.

The second coupling portion 46 extending rearward is formed on the rear end edge of the upper wall 44U of the front crimping portion 44, the rear end edge of the left side wall 44L of the front crimping portion 44 and the rear end edge of the right side wall 44R of the front crimping portion 44. The second coupling portion 46 has a curved surface shape convex upward when viewed from behind.

The rear crimping portion 45 is provided behind the second coupling portion 46. The rear crimping portion 45 includes a base plate portion 50 extending rearward from the rear end edge of the second coupling portion 46, right crimping pieces 51R extending downward from the right end edge of the base plate portion 50 and a left crimping piece 51L extending downward from the left end edge of the base plate portion 50.

The base plate portion 50 has a substantially rectangular shape and has a curved surface shape convex upward when viewed from behind. On the rear end edge of the base plate portion 50, a plurality of (four in this embodiment) protrusions 52 project radially inwardly of the shielded cable 11 while being spaced apart in a circumferential direction of the shielded cable 11. The protrusions 52 are bent radially inwardly of the shielded cable 11 substantially at a right angle from the rear end edge of the base plate portion 50.

With the rear crimping portion 45 crimped to the braided wire 14 and the connection plate portion 36, the protrusions 52 are disposed at positions behind a rear end part of the sleeve 27. Dimensions of the protrusions 52 projecting radially inwardly of the shielded cable 11 are so set that the protrusions 52 can contact the rear end edge of the sleeve 27 from behind with the rear crimping portion 45 crimped to the braided wire 14 and the connection plate portion 36. In this way, if the shielded cable 11 is pulled rearward, the protrusions 52 come into contact with the rear end edge of the sleeve 27, whereby a rearward movement of the shielded cable 11 can be suppressed.

A plurality of (two in this embodiment) the right crimping pieces 51R extend from the right end edge of the base plate portion 50 while being spaced apart in the front-rear direction. The right crimping pieces 51R are respectively provided on front and rear end parts of the right end edge of the base plate portion 50. A right locking portion 53R is formed on a tip part of each right crimping piece 51R. The right locking portion 53R is formed by folding the tip part of the right crimping piece 51R toward an inner surface (toward the braided wire 14).

The left crimping piece 51L extends near a center position in the front-rear direction on the left end edge of the base plate portion 50. A width in the front-rear direction of the left crimping piece 51L is set to be smaller than an interval in the front-rear direction between the pair of right crimping pieces 51R. A left locking portion 53L is formed on a tip part of the left crimping piece 51L. The left locking portion 53L is formed by folding the tip part of the left crimping piece 51L toward an inner surface (toward the braided wire 14).

[Crimping Structure]

Figure 15:
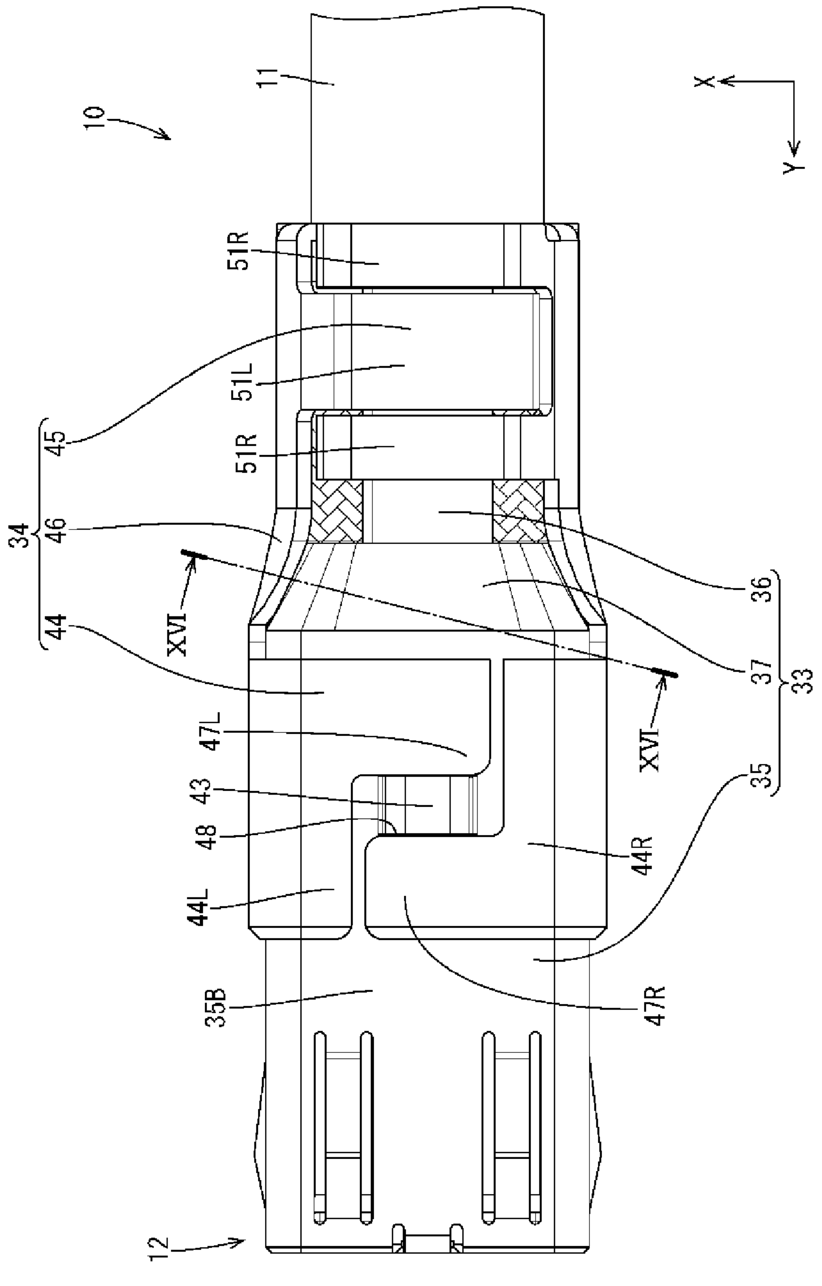
FIG. 15 is a bottom view showing the female connector structure.

As shown in FIG. 15, with the front crimping portion 44 crimped to the outer periphery of the tubular portion 35, the mark 43 is accommodated in the clearance 48 formed between the left and right crimping pieces 47L and 47R. The lower surface of the mark 43 may be located above the lower surfaces of the left and right crimping pieces 47L, 47R or flush with the lower surfaces of the left and right crimping pieces 47L, 47R or project further downward than the lower surfaces of the left and right crimping pieces 47L, 47R.

As shown in FIG. 1, with the front crimping portion 44 crimped to the outer periphery of the tubular portion 35, the locking pieces 40 and the through holes 41 of the tubular portion 35 are covered from outside in the lateral direction by the left and right side walls 44L, 44R of the front crimping portion 44. In this way, the dielectric 19 is prevented from being exposed from the through holes 41 of the tubular portion 35. As a result, it can be suppressed that noise generated in the female terminals 18 or cores 16 leaks to outside through the through holes 41 of the tubular portion 35 or external noise enters the female terminals 18 or cores 16 through the through holes 41 of the tubular portion 35.

With the rear crimping portion 45 crimped to the braided wire 14 and the connection plate portion 36, the right locking portions 53R are in contact with the left side edge of the connection plate portion 36 in a direction along a radial direction of the shielded cable 11. Further, the left locking portion 53L is in contact with the right side edge of the connection plate portion 36 in a direction along the radial direction of the shielded cable 11. In this way, the opening deformation of the rear crimping portion 45 is suppressed in the radial direction of the shielded cable 11.

Figure 16:
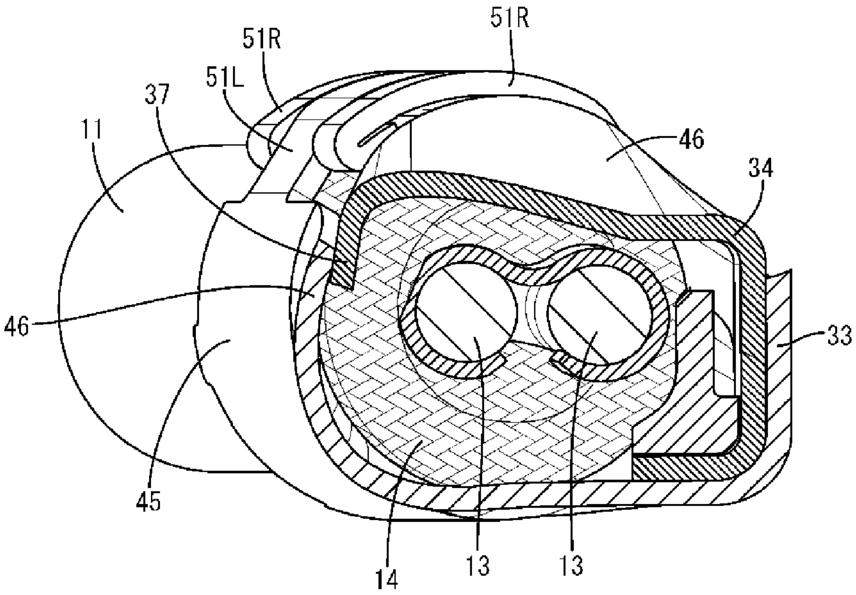
FIG. 16 is a section along XVI-XVI in FIG. 15.
Figure 17:
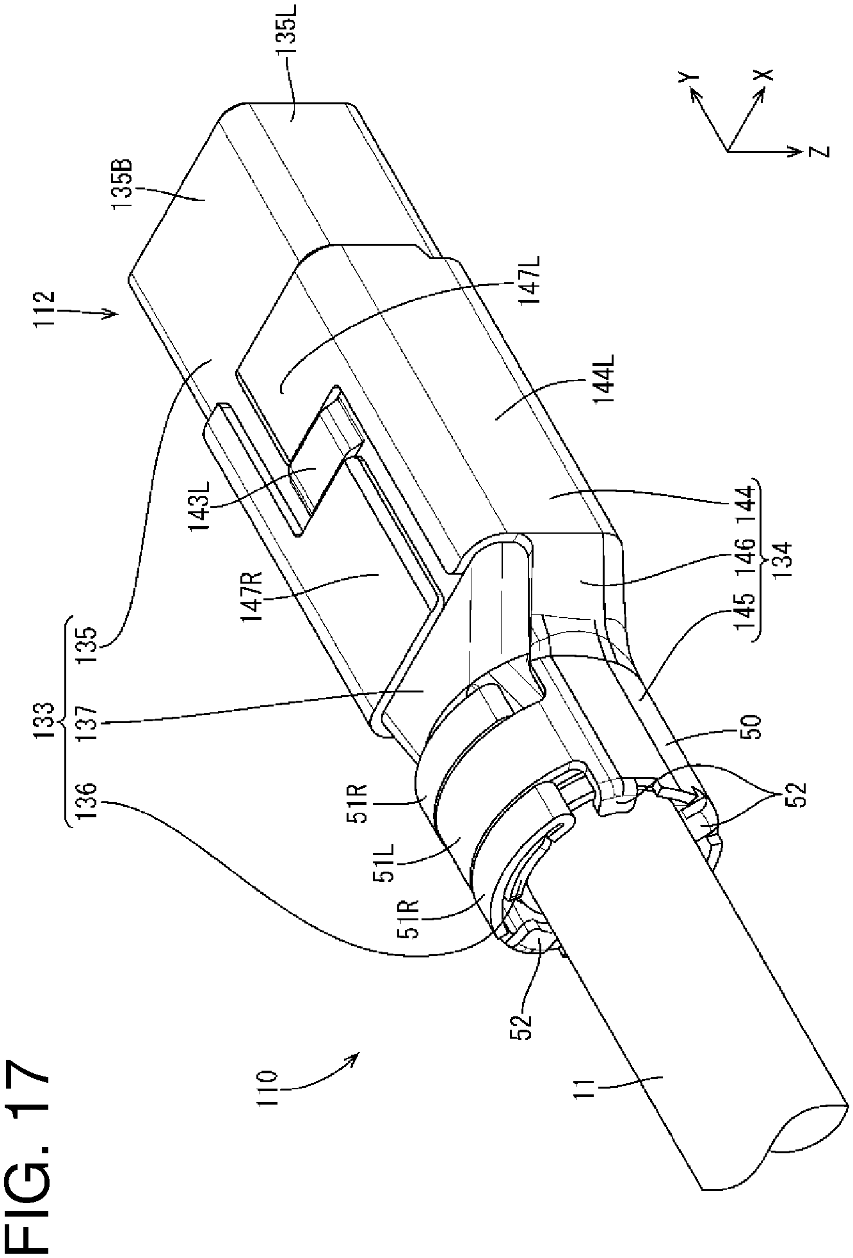
FIG. 17 is a perspective view showing a male connector structure according to a second embodiment.

As shown in FIG. 16, with the front crimping portion 44 crimped to the outer periphery of the tubular portion 35 and the rear crimping portion 45 crimped to the braided wire 14 and the connection plate portion 36, a part of the second coupling portion 46 near a lower end is overlapped on a part of the first coupling portion 37 near an upper end part from outside in the radial direction of the shielded cable 11. In this embodiment, the inner surface of the second coupling portion 46 is in close contact with the outer surface of the first coupling portion 37 in a part where the second coupling portion 46 is overlapped on the outside of the first coupling portion 37.

[Assembling Process of Female Connector Structure 10]

Next, an example of an assembling process of the female connector structure 10 according to this embodiment is described. The assembling process of the female connector structure 10 is not limited to the one described below.

In the end part of the shielded cable 11, the sheath 15 is stripped over a predetermined length, thereby exposing the braided wire 14 from the sheath 15. By cutting the wire barrel 14 to a predetermined length, the coated wires 13 are exposed from the braided wire 14.

In the end of the coated wire 13, the insulation coating 17 is stripped over a predetermined length, thereby exposing the core 16 from the insulation coating 17. The wire barrel 22 is crimped to the outer periphery of the core 16 and the insulation barrel 21 is crimped to the outer periphery of the insulation coating 17, whereby the female terminal 18 is connected to the end of the coated wire 13 (see FIG. 3).

As shown in FIGS. 3 and 4, the sleeve 27 is externally fit to the end part of the sheath 15. By folding the braided wire 14 exposed from the end part of the sheath 15, the braided wire 14 is put on the outside of the sleeve 27 in the radial direction of the shielded cable 11 (see FIG. 5).

As shown in FIG. 6, the clip 25 is fit to the two coated wires 13 from below. As shown in FIG. 7, the shielded cable 11 is vertically inverted and the female terminals 18 are placed on the upper wall of the vertically inverted upper dielectric 29 from above. As shown in FIG. 8, the lower dielectric 28 is assembled with the upper dielectric 29 from above the upper dielectric 29. By the resilient engagement of the lock receiving portions 31 of the lower dielectric 28 with the lock claws 30 of the upper dielectric 29, the upper and lower dielectrics 29, 28 are integrally assembled (see FIG. 9).

Figure 11:
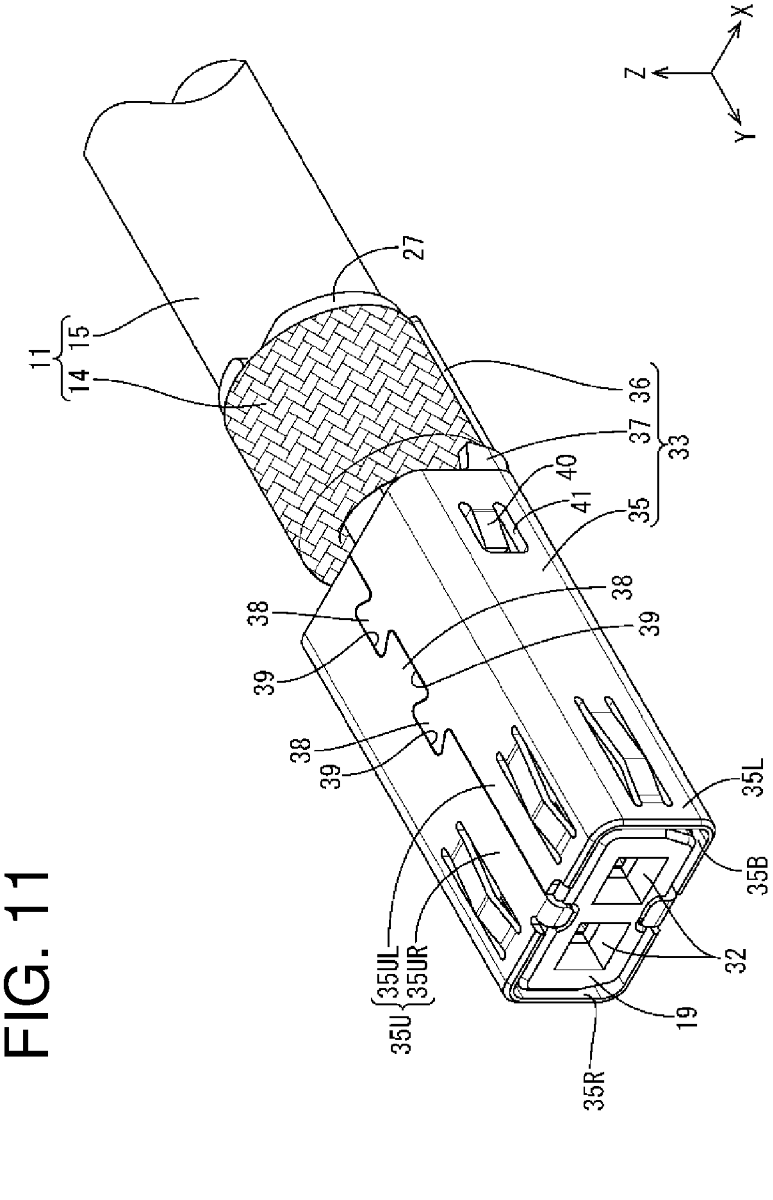
FIG. 11 is a perspective view showing a state where the dielectric is inserted in the tubular portion of the first outer conductor.
Figure 12:
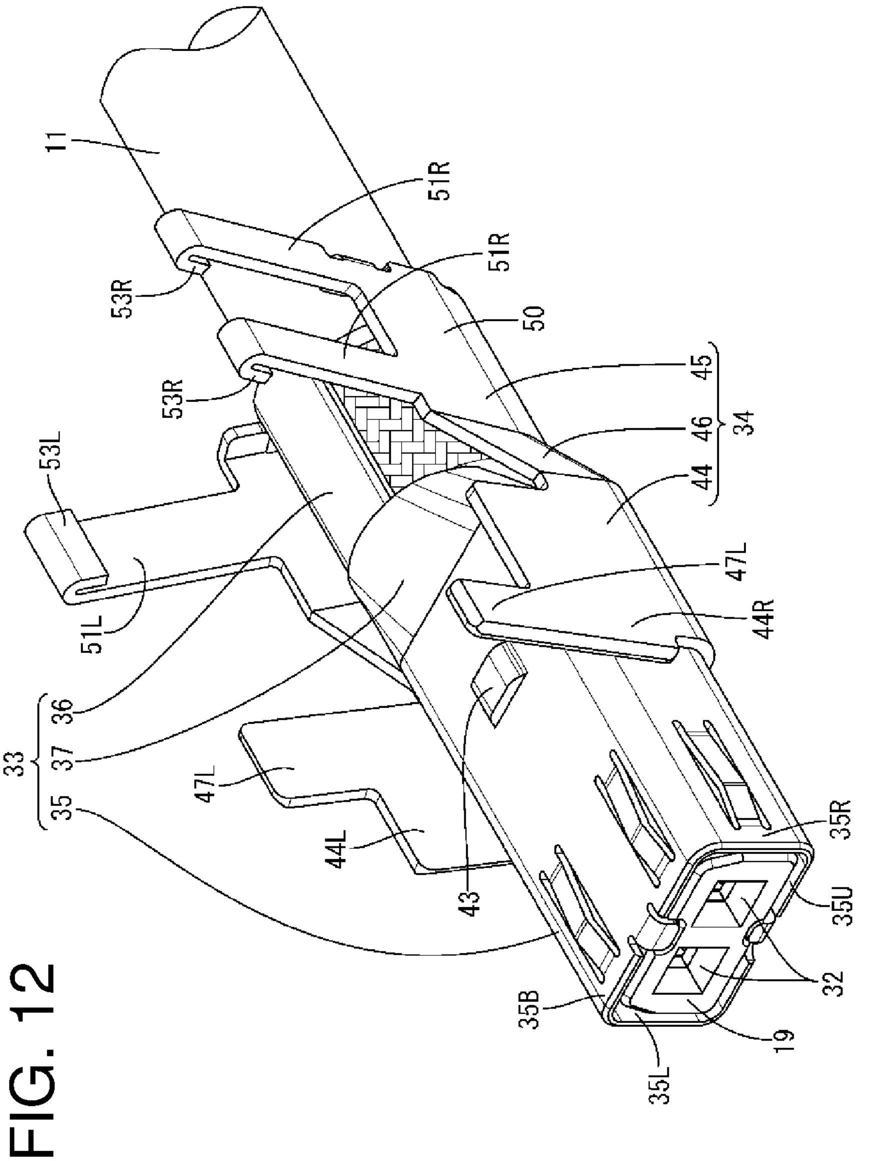
FIG. 12 is a perspective view showing a step of connecting the first and second outer conductors.

As shown in FIGS. 10 and 11, the shielded cable 11 is vertically inverted and the dielectric 19 is inserted into the tubular portion 35 of the first outer conductor 33 from behind. The locking pieces 40 of the first outer conductor 33 are resiliently locked to the locking recesses 42 of the dielectric 19 from behind, whereby the dielectric 19 is retained and held in the tubular portion 35. At this time, the connection plate portion 36 of the first outer conductor 33 is overlapped below the braided wire 14.

As shown in FIG. 13, the second outer conductor 34 is vertically inverted and the first outer conductor 33, the braided wire 14 and the connection plate portion 36 are placed on the second outer conductor 34 from above. The front crimping portion 44 is crimped to the outer periphery of the tubular portion 35, and the rear crimping portion 45 is crimped to the outer peripheries of the braided wire 14 and the connection plate portion 36.

The front crimping portion 44 is crimped with the mark 43 formed on the bottom wall 35B of the tubular portion 35 as a marker. By visually confirming the mark 43 formed on the bottom wall 35B, the crimped position of the second outer conductor 34 can be confirmed. Thus, a crimping step of the second outer conductor 34 can be made efficient. Further, by accommodating the mark 43 in the clearance 48 in the front-rear direction between the left and right crimping pieces 47L and 47R, it can be easily confirmed that the second outer conductor 34 has been crimped at a correct position.

The rear crimping portion 45 is so crimped that the left and right crimping pieces 51L, 51R are wound on the outer peripheries of the braided wire 14 and the connection plate portion 36. The left locking portion 53L of the left crimping piece 51L is locked to the right side edge of the connection plate portion 36, and the right locking portions 53R of the right crimping pieces 51R are locked to the left side edge of the connection plate portion 36. In this way, the opening deformation of the rear crimping portion 45 is suppressed. By crimping the rear crimping portion 45 to the braided wire 14 and the connection plate portion 36, the braided wire 14 and the first and second outer conductors 33, 34 are electrically connected.

The second coupling portion 46 of the second outer conductor 34 is crimped to the outer periphery of the first coupling portion 37 of the first outer conductor 33 in the same step as the step of crimping the front and rear crimping portions 44, 45 of the second outer conductor 34 to the first outer conductor 33. In this way, the inner surface of the second coupling portion 46 can be held in close contact with the outer surface of the first coupling portion 37 in the part where the second coupling portion 46 is overlapped on the outside of the first coupling portion 37. In the above way, the connector structure is completed.

Functions and Effects of Embodiment

Next, functions and effects of this embodiment are described. The female connector 12 according to this embodiment is connected to the end part of the shielded cable 11 configured such that the outer peripheries of the coated wires 13 each including the core 16 and the insulation coating 17 surrounding the outer periphery of the core 16 are surrounded by the braided wire 14, and includes the female terminals 18 to be connected to the cores 16, the insulating dielectric 19 for surrounding the female terminals 18, the first outer conductor 33 having the tubular portion 35 for surrounding the dielectric 19, the connection plate portion 36 to be overlapped on the braided wire 14 and the first coupling portion 37 coupling the tubular portion 35 and the connection plate portion 36, and the second outer conductor 34 having the rear crimping portion 45 to be crimped to the braided wire 14 and the connection plate portion 36 from outside the braided wire 14 and the connection plate portion 36, the front crimping portion 44 to be crimped to the tubular portion 35 from outside the tubular portion 35 and the second coupling portion 46 coupling the rear crimping portion 45 and the front crimping portion 44, and the outer peripheries of the cores 16 are surrounded by the first and second coupling portions 37, 46 with the second coupling portion 46 at least partially overlapped on the outside of the first coupling portion 37.

Further, the female connector structure 10 according to this embodiment includes the shielded cable 11 configured such that the outer peripheries of the coated wires 13 each including the core 16 and the insulation coating 17 surrounding the outer periphery of the core 16 are surrounded by the braided wire 14, the female terminals 18 to be connected to the cores 16 exposed from the end part of the shielded cable 11, the insulating dielectric 19 for surrounding the female terminals 18, the first outer conductor 33 having the tubular portion 35 for surrounding the dielectric 19, the connection plate portion 36 to be overlapped on the braided wire 14 and the first coupling portion 37 coupling the tubular portion 35 and the connection plate portion 36, and the second outer conductor 34 having the rear crimping portion 45 to be crimped to the braided wire 14 and the connection plate portion 36 from outside the braided wire 14 and the connection plate portion 36, the front crimping portion 44 to be crimped to the tubular portion 35 from outside the tubular portion 35 and the second coupling portion 46 coupling the rear crimping portion 45 and the front crimping portion 44, and the outer peripheries of the cores 16 are surrounded by the first and second coupling portions 37, 46 with the second coupling portion 46 at least partially overlapped on the outside of the first coupling portion 37.

According to the above configurations, since the part where the second coupling portion 46 is overlapped on the outside of the first coupling portion 37 is formed, the female terminals 18 and the coated wires 13 are prevented from being exposed to the outside of the first and second outer conductors 33, 34. In this way, noise generated from the cores 16 to outside or noise entering the cores 16 from outside can be suppressed. In this way, the shielding performance of the female connector 12 and the female connector structure 10 can be improved.

Further, according to this embodiment, the inner surface of the second coupling portion 46 is in close contact with the outer surface of the first coupling portion 37 in the part where the second coupling portion 46 is overlapped on the outside of the first coupling portion 37.

According to the above configuration, noise generated to outside from the cores 16 or noise entering the cores 16 from outside can be reliably suppressed. In this way, the shielding performance of the female connector 12 and the female connector structure 10 can be reliably improved.

Second Embodiment

A second embodiment relating to the technique disclosed in this specification is described with reference to FIGS. 17 to 26. In a male connector structure 110 (example of the connector structure) according to this embodiment, a male connector 112 (example of the connector) is connected to an end of a shielded cable 11. In the following description, a Z direction, a Y direction and an X direction are respectively referred to as an upward direction, a forward direction and a leftward direction. Only some of a plurality of members may be denoted by a reference sign and the other members may not be denoted by the reference sign.

[Male Connector 112]

The male connector 112 includes male terminals 118 (example of the inner conductor), an insulating dielectric 119 for surrounding the outer peripheries of the male terminals 118 and an outer conductor 20 for surrounding the outer periphery of the dielectric 119. The outer conductor 20 includes a first outer conductor 133 and a second outer conductor 134 electrically connected to the first outer conductor 133.

[Male Terminals 118]

[Male Terminals 118]

Figure 18:
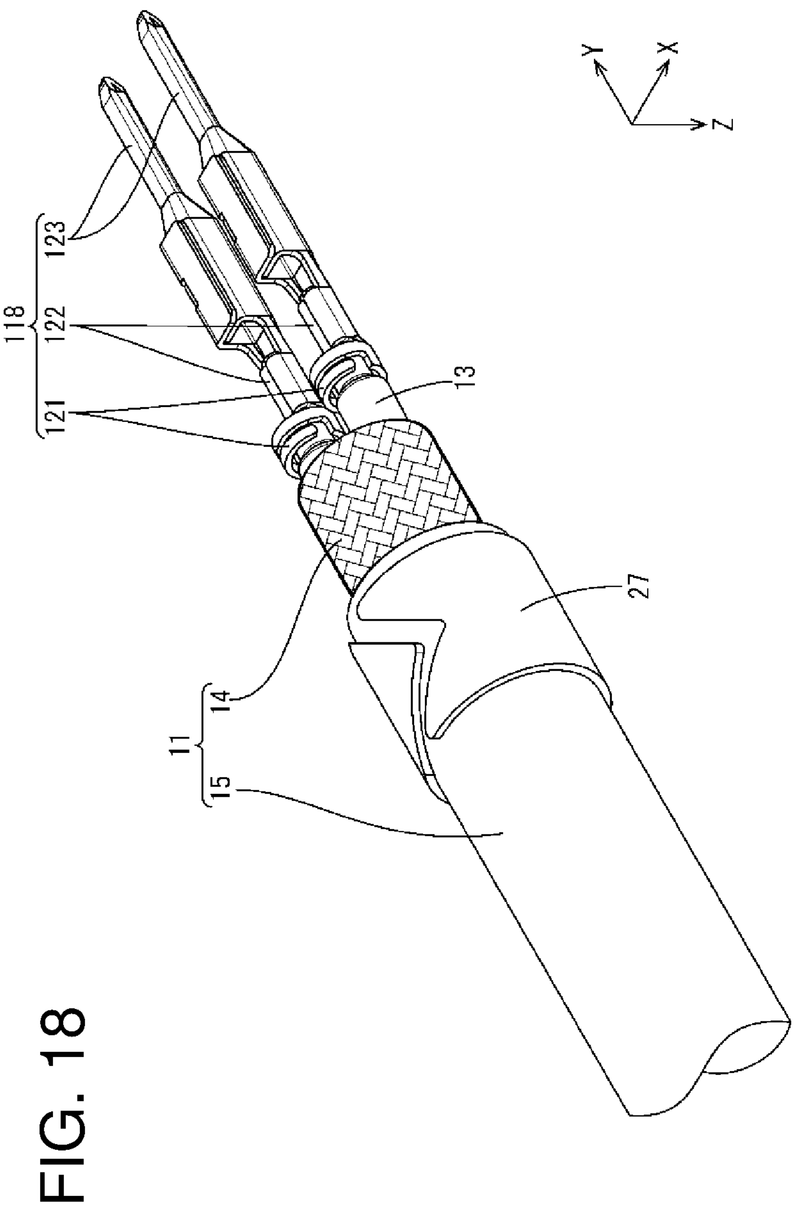
FIG. 18 is a perspective view showing a state where a sleeve is externally fit to a sheath.

As shown in FIG. 18, the male terminal 118 is formed by press-working a metal plate material into a predetermined shape. An arbitrary metal such as copper, copper alloy, aluminum or aluminum alloy can be selected as a metal constituting the male terminal 118 according to need. The male terminal 118 is connected to the end of each coated wire 13. The male terminal 118 includes an insulation barrel 121 to be crimped to wind around the outer periphery of the insulation coating 17 of the coated wire 13, a wire barrel 122 connected in front of the insulation barrel 121 and to be crimped to wind around the outer periphery of the core 16, and a male tab 123 connected in front of the wire barrel 122 and to be inserted into a connection tube portion of an unillustrated mating terminal. By inserting the male tab 123 into the connection tube portion, the mating terminal and the male terminal 118 are electrically connected.

[Dielectric 119]

Figure 19:
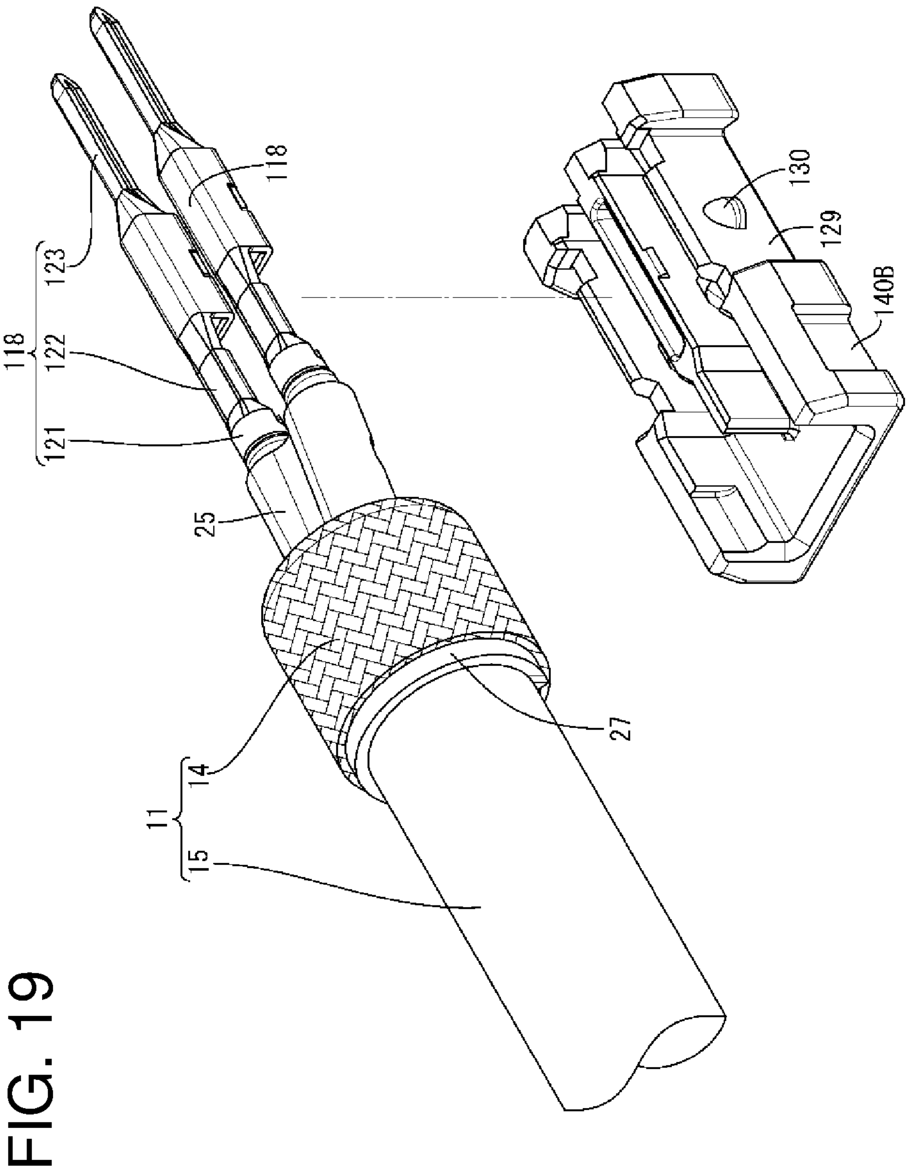
FIG. 19 is a perspective view showing a step of placing male terminals on an upper dielectric.
Figure 20:
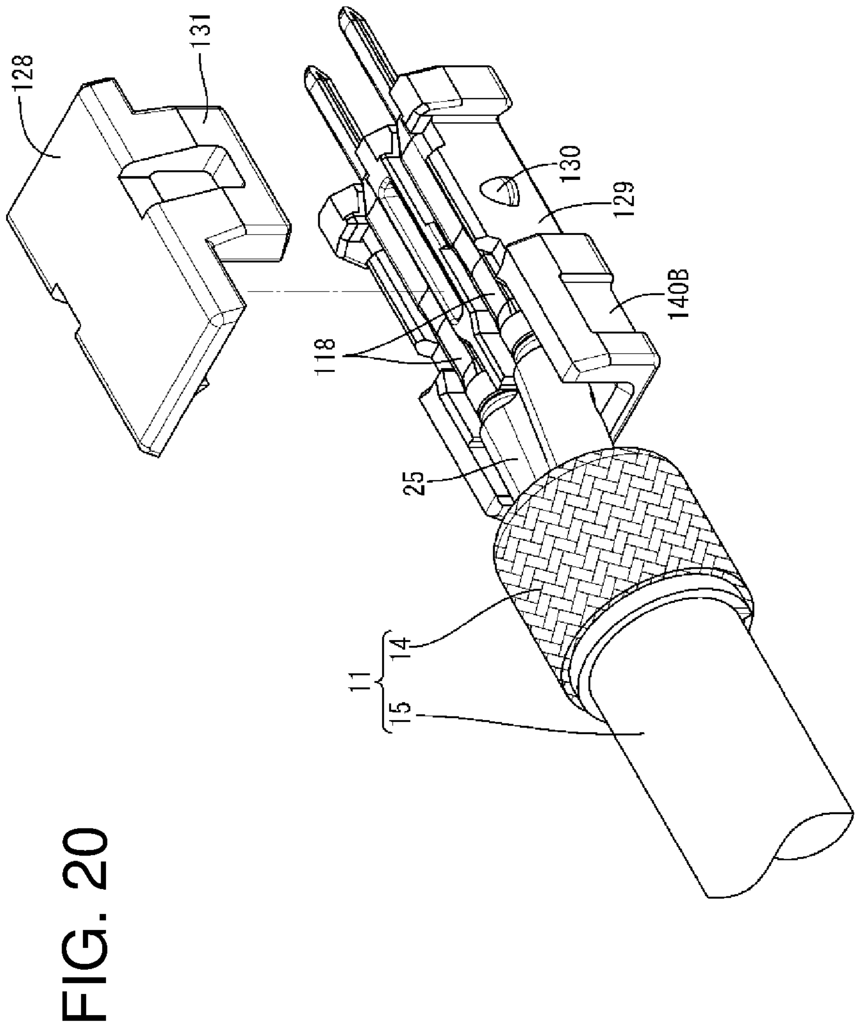
FIG. 20 is a perspective view showing a step of assembling the upper dielectric and a lower dielectric.
Figure 21:
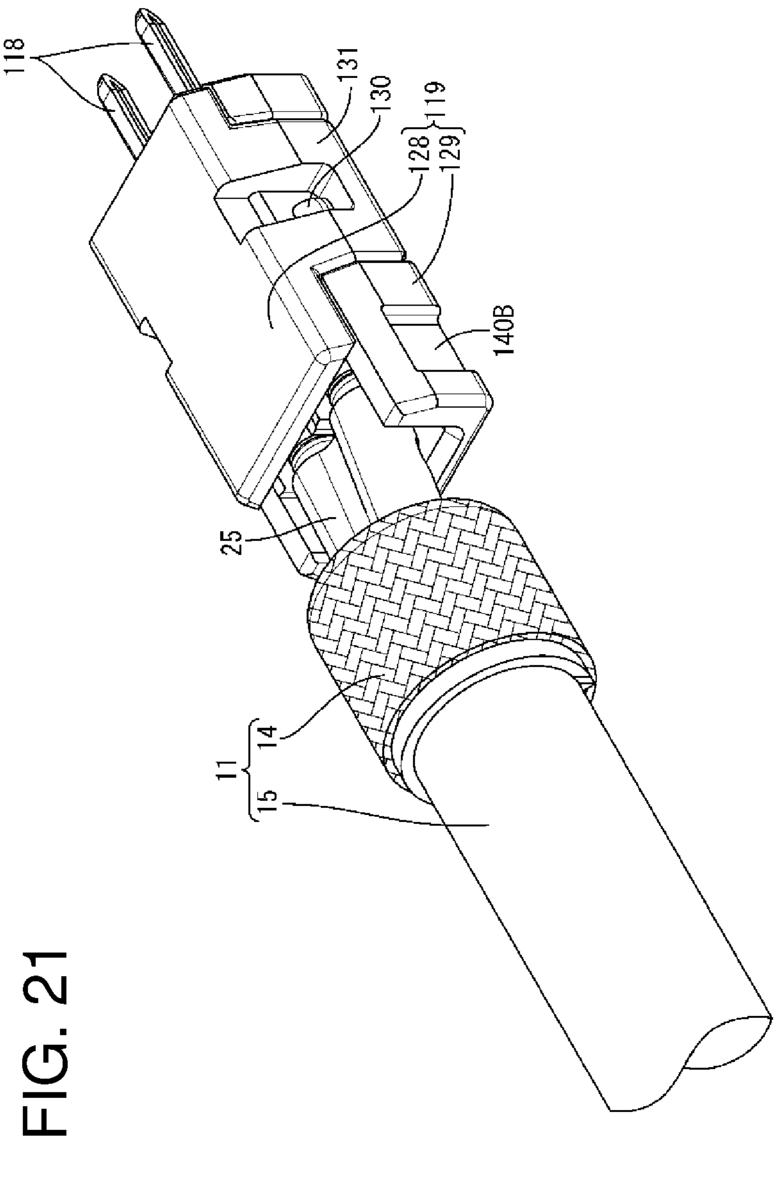
FIG. 21 is a perspective view showing a state where the upper and lower dielectrics are assembled.

As shown in FIGS. 19 to 21, the male terminals 118 are surrounded by the dielectric 119. The dielectric 119 is in the form of a rectangular parallelepiped extending in a front-rear direction as a whole. The dielectric 119 includes a lower dielectric 128 open upward and arranged on a lower side and an upper dielectric 129 to be assembled with the lower dielectric 128 from above. The lower and upper dielectrics 128, 129 are formed by injection-molding an insulating synthetic resin. The lower and upper dielectrics 128, 129 are integrally assembled by resiliently locking lock claws 130 projecting outward from side edges of the upper dielectric 129 and resiliently deformable lock receiving portions 131 formed at positions of the lower dielectric 128 corresponding to the lock claws 130. The lock receiving portions 131 are substantially gate-shaped. With the lower and upper dielectrics 128, 129 assembled, cavities 132 for accommodating the male terminals 118 are formed to extend in the front-rear direction in the dielectric 119. In this embodiment, a plurality of (two in this embodiment) the cavities 132 are formed side by side in a lateral direction.

[First Outer Conductor 33]

Figure 22:
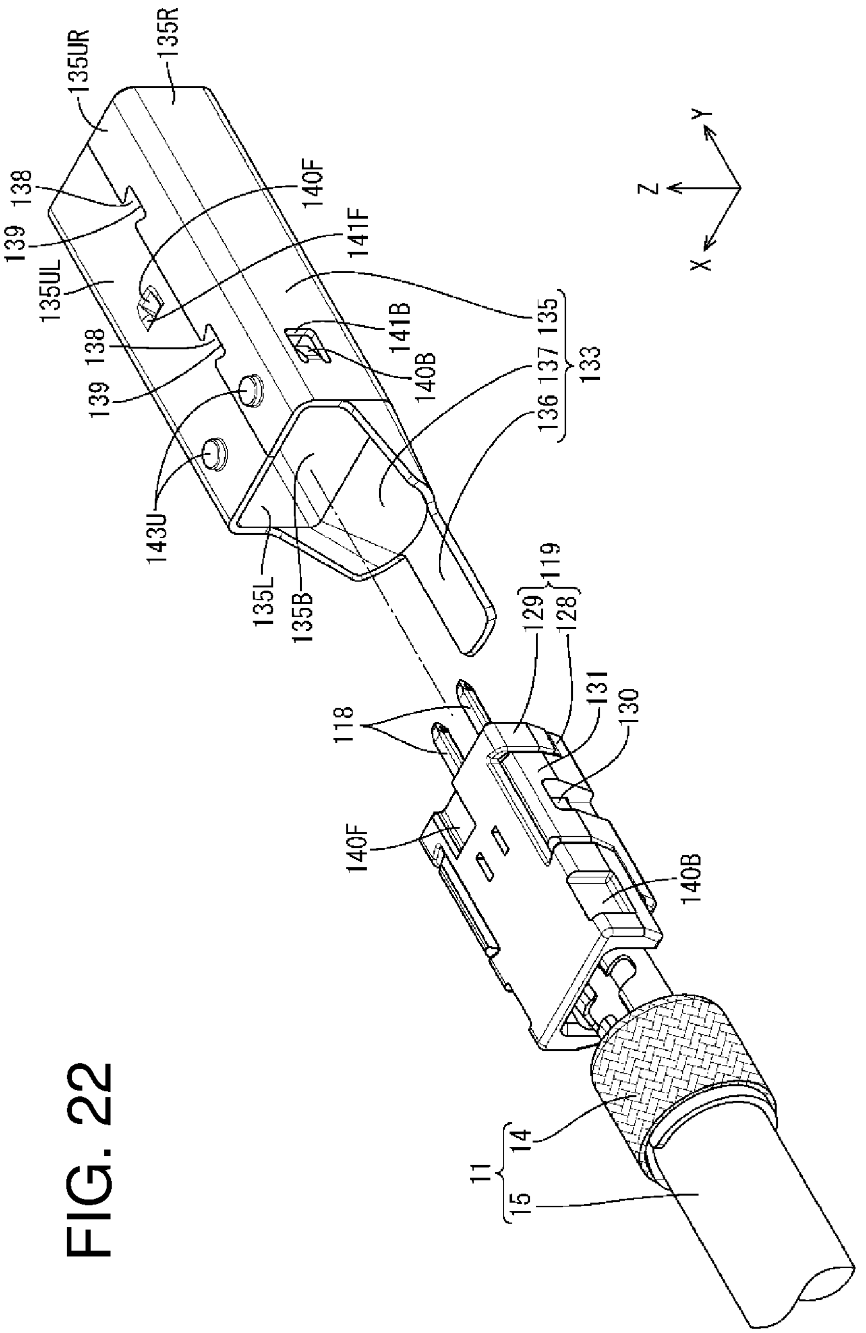
FIG. 22 is a perspective view showing a step of inserting a dielectric into a tubular portion of a first outer conductor.
Figure 23:
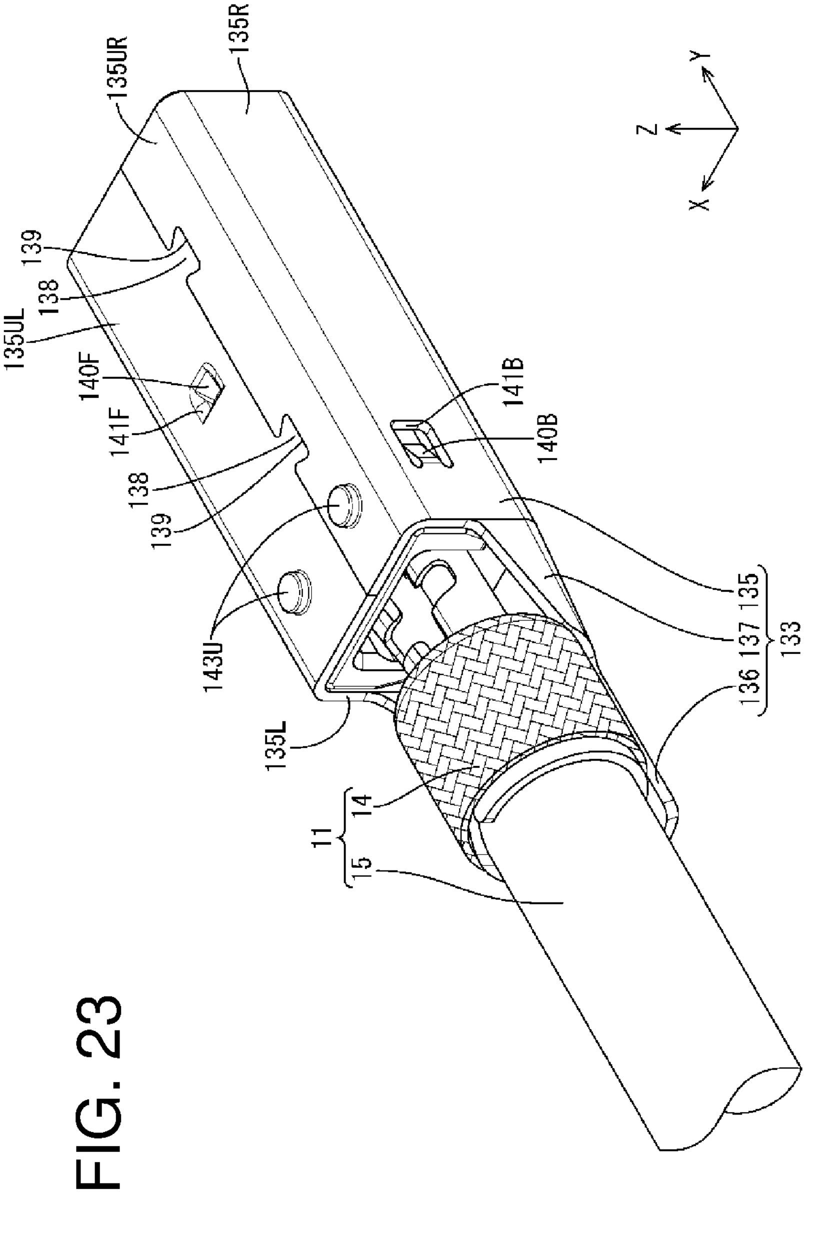
FIG. 23 is a perspective view showing a state where the dielectric is inserted in the tubular portion of the first outer conductor.
Figure 26:
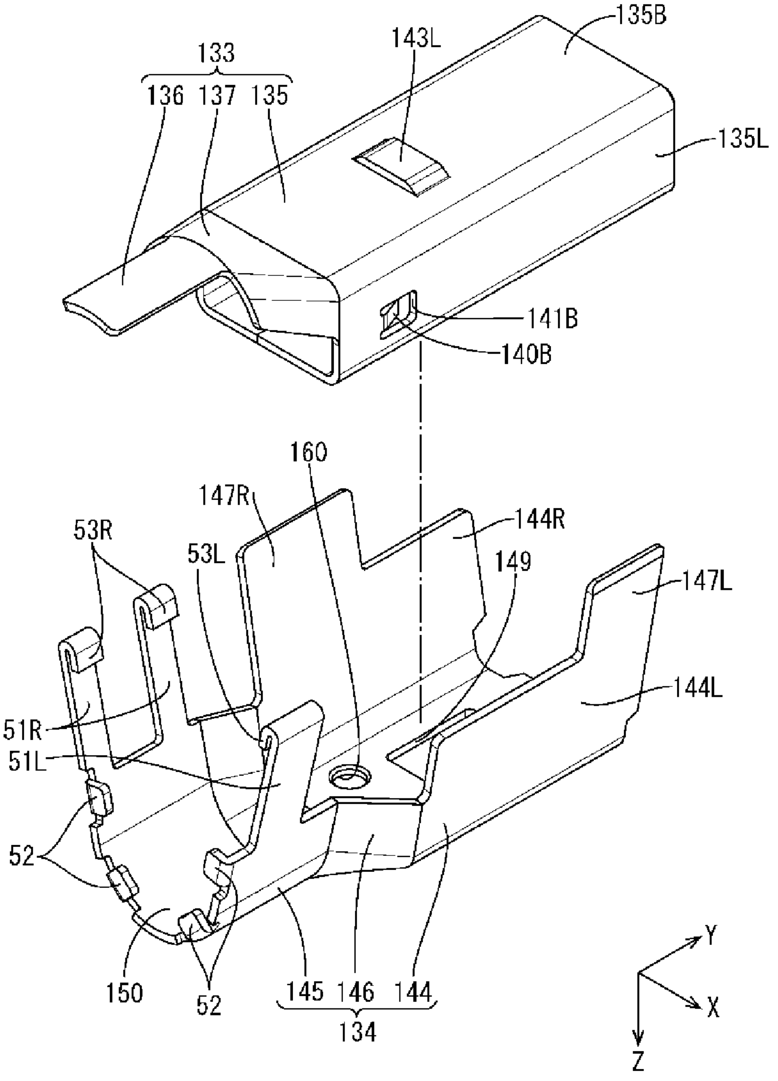
FIG. 26 is an exploded perspective view showing the first and second outer conductors.

As shown in FIGS. 22 and 26, the first outer conductor 133 is formed by press-working a metal plate material into a predetermined shape. An arbitrary metal such as copper, copper alloy, aluminum or aluminum alloy can be selected as a metal constituting the first outer conductor 133 according to need. The first outer conductor 133 includes a tubular portion 135 in the form of a rectangular tube extending in the front-rear direction, a connection plate portion 136 disposed behind the tubular portion 135, in the form of an elongated plate extending in the front-rear direction and overlapped on the braided wire 14 folded on the outer periphery of the sheath 15, and a first coupling portion 137 coupling the tubular portion 135 and the connection plate portion 136 in the front-rear direction.

The inner shape of the tubular portion 135 is the same as or somewhat larger than the outer shape of the dielectric 119. The dielectric 119 is inserted into the tubular portion 135 from behind (see FIG. 22). The tubular portion 135 includes a bottom wall 135B, a left side wall 135L extending upward from the left side edge of the bottom wall 135B, a right side wall 135R extending upward from the right side edge of the bottom wall 135B and an upper wall 135U. The upper wall 135U is so formed that the right end edge of a left half 135UL extending rightward from the upper end edge of the left side wall 135L and the left end edge of a right half 135UR extending leftward from the upper end edge of the right side wall 135R butt against each other near a center in the lateral direction. The right end edge of the left half 135UL and the left end edge of the right half 135UR are respectively formed with substantially trapezoidal projections 138 and substantially trapezoidal recesses 139, and the opening deformation of the tubular portion 135 is suppressed by fitting the projections 138 and the recesses 139.

Rear locking pieces 140B extending in the front-rear direction and cantilevered forward with rear end parts as base parts are formed at positions near the rear end parts of the left and right side walls 135L, 135R of the tubular portion 135. The rear locking pieces 140B are formed to extend laterally inward toward a front side. Rear through holes 141B left by cutting and raising the locking pieces 140B from the left and right side walls 135L, 135R are formed near the rear locking pieces 140B. The rear locking pieces 140B are formed to be resiliently deformable in the lateral direction. The dielectric 119 is retained and held in the tubular portion 135 by locking front end parts of the rear locking pieces 140B to rear locking recesses 142B formed at positions near a rear end part of the dielectric 119 from behind.

A front locking piece 140F extending in the front-rear direction and cantilevered rearward with a front end part as a base part is formed at a position near a center position in the front-rear direction of the left half 135UL of the tubular portion 135. The front locking piece 140F is formed to extend inwardly of the tubular portion 135 toward a rear side. A front through hole 141F left by cutting and raising the front locking piece 140F from the upper wall 135U is formed near the front locking piece 140F. The front locking piece 140F is resiliently deformable in the vertical direction. The dielectric 119 is retained and held in the tubular portion 135 by locking a rear end part of this front locking piece 140F to a front locking recess 142F formed near a center position in the front-rear direction of the dielectric 119 from front.

The bottom wall 135B of the tubular portion 135 is formed with a lower mark 143L projecting downward at a position somewhat forward of the rear locking pieces 140B and the rear through holes 141B and near a lateral center. The lower mark 143L is formed by striking the bottom wall 135B of the tubular portion 135 downward.

The upper wall 135U of the tubular portion 135 is formed with a plurality of (two in this embodiment) upper marks 143U projecting upward and arranged side by side while being spaced apart in the lateral direction substantially at the same position as the rear locking pieces 140B and the rear through holes 141B in the front-rear direction. The upper marks 143U are formed by striking the upper wall 135U of the tubular portion 135 upward. Each upper mark 143U has a cylindrical shape.

[Second Outer Conductor 134]

Figure 24:
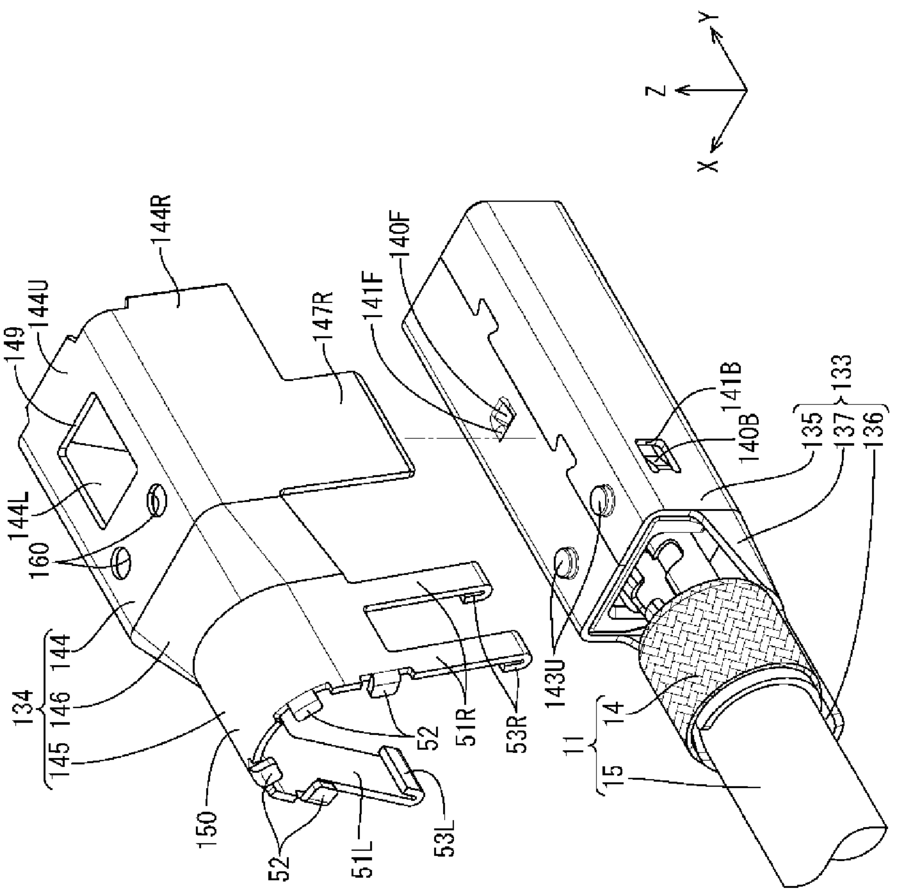
FIG. 24 is a perspective view showing a step of connecting the first outer conductor and a second outer conductor.

As shown in FIGS. 24 and 26, the second outer conductor 134 is formed by press-working a metal plate material into a predetermined shape. An arbitrary metal such as copper, copper alloy, aluminum or aluminum alloy can be selected as a metal constituting the second outer conductor 134 according to need. The second outer conductor 134 includes a front crimping portion 144 (example of the tube crimping portion) to be crimped to the outer periphery of the tubular portion 135, a rear crimping portion 145 (example of the shield crimping portion) to be crimped to the braided wire 14 folded on the end of the sheath 15 and the connection plate portion 136 overlapped on the braided wire 14, and a second coupling portion 146 coupling the front and rear crimping portions 144, 145 in the front-rear direction.

The front crimping portion 144 includes an upper wall 144U, a left side wall 144L extending downward from the left side edge of the upper wall 144U, a right side wall 144R extending downward from the right side edge of the upper wall 144U, a left crimping piece 147L extending rightward from a part near a rear end part, out of the lower end edge of the left side wall 144L, and a right crimping piece 147R extending leftward from a part near a rear end part, out of the lower end edge of the right side wall 144R. With the front crimping portion 144 crimped to the outer periphery of the tubular portion 135, the upper wall 144U of the front crimping portion 144 covers the upper wall 135U of the tubular portion 135 from above, the left side wall 144L of the front crimping portion 144 covers the left side wall 135L of the tubular portion 135 from left, the right side wall 144R of the front crimping portion 144 covers the right side wall 135R of the tubular portion 135 from right, and the left and right crimping pieces 147L, 147R of the front crimping portion 144 cover the bottom wall 135B of the tubular portion 135 from below.

A clearance 148 (corresponding to a recess) is formed in the front-rear direction between the left and right crimping pieces 147L, 147R of the front crimping portion 144. A width in the front-rear direction of this clearance 148 is equal to or somewhat larger than that of the lower mark 143L of the tubular portion 135.

With the front crimping portion 144 crimped to the outer periphery of the tubular portion 135, the lower mark 143L is accommodated in the clearance 148 formed between the left and right crimping pieces 147L, 147R. The lower surface of the lower mark 143L may be located above the lower surfaces of the left and right crimping pieces 147L, 147R or flush with the lower surfaces of the left and right crimping pieces 147L, 147R or project further downward than the lower surfaces of the left and right crimping pieces 147L, 147R.

The rear end edge of the left crimping piece 147L can come into contact with the front end edge of the lower mark 143L from front. Further, the front end edge of the right crimping piece 147R can come into contact with the rear end edge of the lower mark 143L from behind. In this way, the tubular portion 135 and the front crimping portion 144 are positioned in the front-rear direction.

Recesses 160 are formed at positions corresponding to the upper marks 143U with the front crimping portion 144 crimped to the outer periphery of the tubular portion 135 at positions near a rear end part of the upper wall 144U of the front crimping portion 144. The recesses 160 are formed to penetrate through the upper wall 144U. The inner shapes of the recesses 160 are circular when viewed from below and set to be the same as or somewhat larger than the outer shapes of the upper marks 143U. With the front crimping portion 144 crimped to the outer periphery of the tubular portion 135, the upper marks 143U are respectively inserted in the recesses 160. The upper surfaces of the upper marks 143U may be located below the upper surface of the upper wall 144U or flush with the upper surface of the upper wall 144U or may project further upward than the upper surface of the upper wall 144U.

A locking hole 149 having a substantially rectangular shape when viewed from above penetrates through the upper wall 144U of the front crimping portion 144 at a position somewhat forward of the recesses 160. A locking lance of an unillustrated connector housing is locked to a hole edge part of this locking hole 149.

Figure 25:
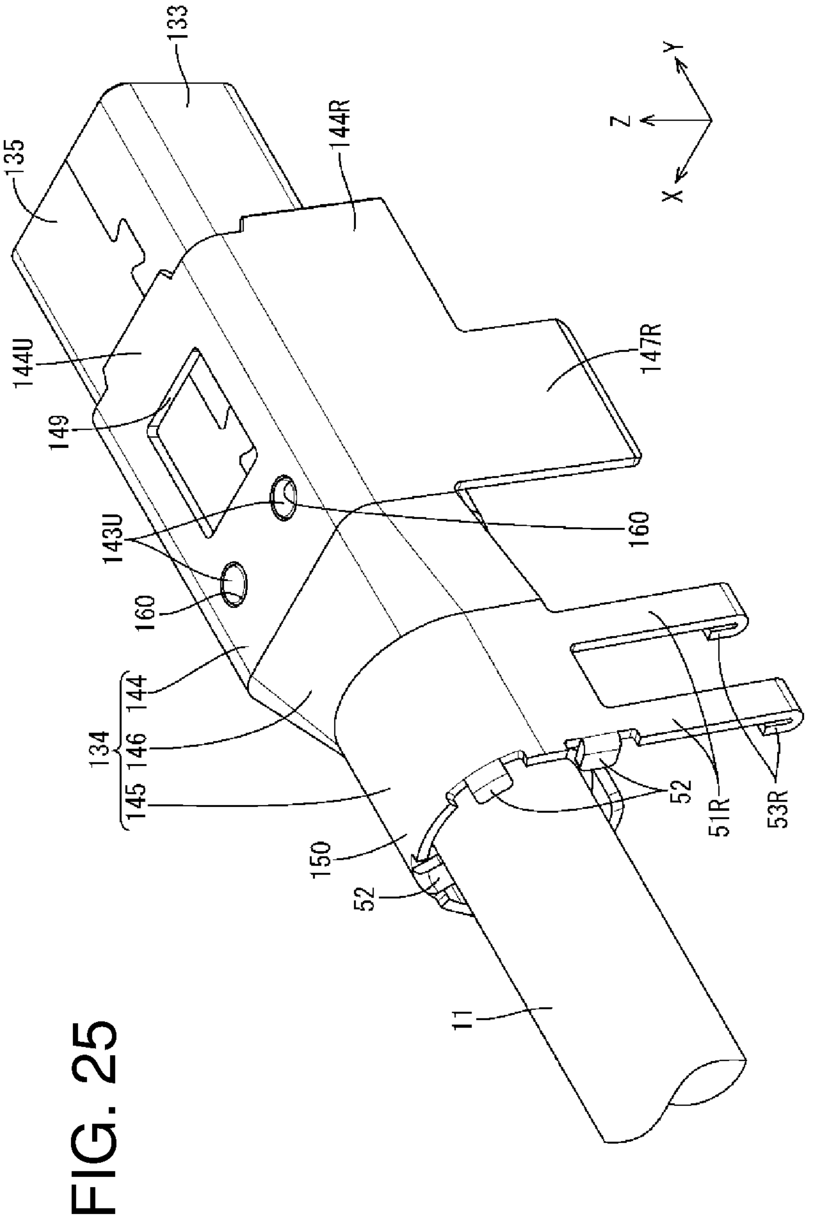
FIG. 25 is a perspective view showing the step of connecting the first and second outer conductors.

With the front crimping portion 144 crimped to the outer periphery of the tubular portion 135, the rear locking pieces 140B and the rear through holes 141B of the tubular portion 135 are covered from outside in the lateral direction by the left and right side walls 144L, 144R of the front crimping portion 144 (see also FIGS. 24 and 25). In this way, the dielectric 119 is prevented from being exposed from the rear through holes 141B of the tubular portion 135. As a result, it can be suppressed that noise generated in the female terminals 118 or cores 16 leaks to outside through the rear through holes 141B of the tubular portion 135 or external noise enters the female terminals 118 or cores 16 through the rear through holes 141B of the tubular portion 135.

With the front crimping portion 144 crimped to the outer periphery of the tubular portion 135, the front locking piece 140F and the front through hole 141F of the tubular portion 135 are covered from above by the upper wall 144U of the front crimping portion 144 (see also FIGS. 24 and 25). In this way, the dielectric 119 is prevented from being exposed from the front through hole 141F of the tubular portion 135. As a result, it can be suppressed that noise generated in the female terminals 118 or cores 16 leaks to outside through the front through hole 141F of the tubular portion 135 or external noise enters the female terminals 118 or cores 16 through the front through holes 141F of the tubular portion 135.

Since components other than the above ones and functions and effects are substantially the same as in the first embodiment, the same members are denoted by the same reference signs and repeated description is omitted.

Third Embodiment

Figure 27:
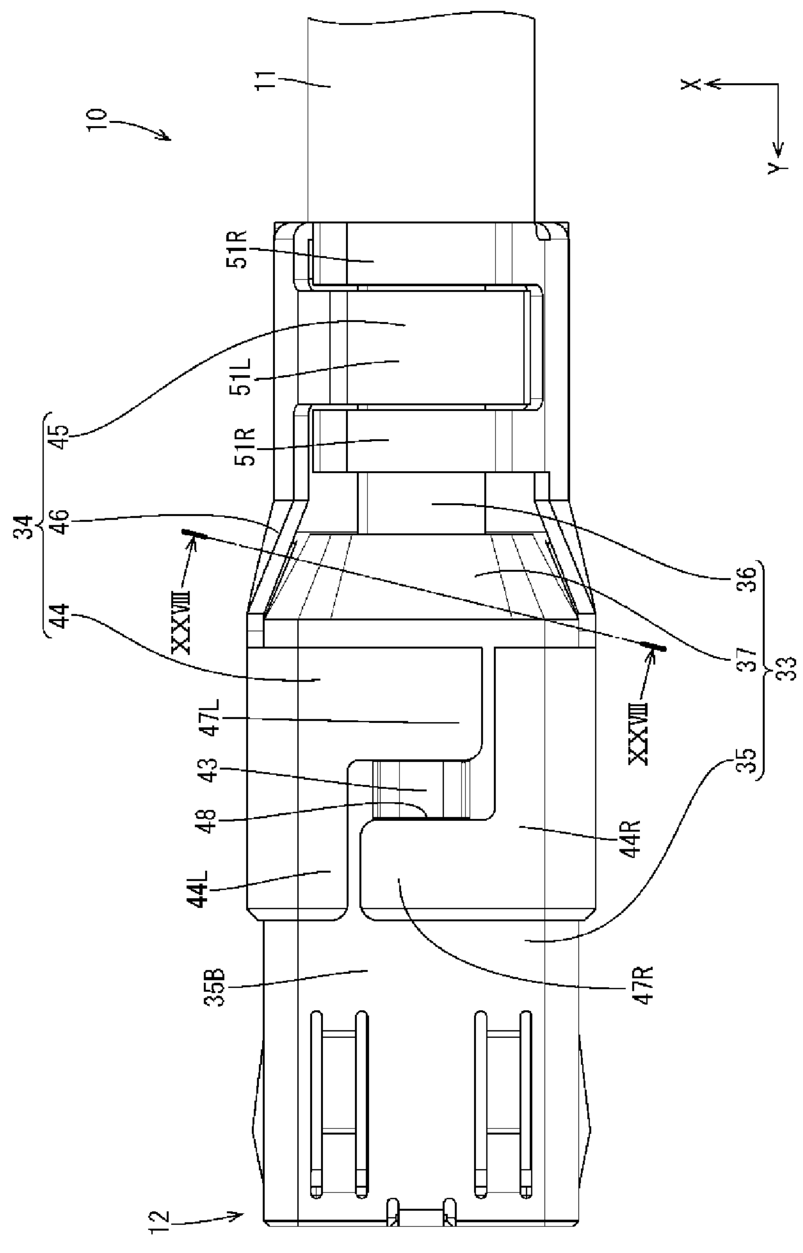
FIG. 27 is a bottom view showing a female connector structure according to a third embodiment.
Figure 28:
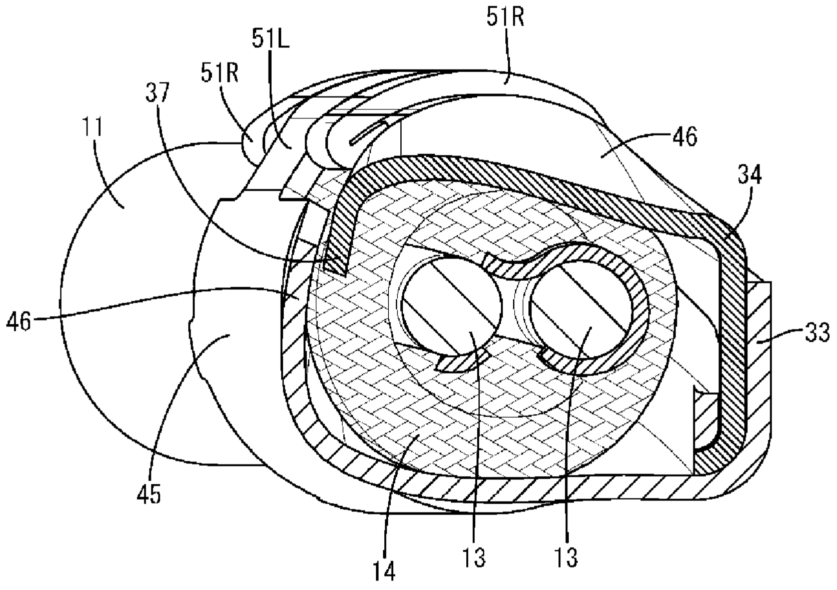
FIG. 28 is a section along XXVIII-XXVIII in FIG. 27.

A third embodiment is described with reference to FIGS. 27 and 28. In a female connector 12 according to the third embodiment, the inner surface of a second coupling portion 46 is formed along the outer surface of a first coupling portion 37 with a clearance formed between the first and second coupling portions 37, 46 in a part where the second coupling portion 46 is overlapped on the outside of the first coupling portion 37.

Since components other than the above ones are substantially the same as in the first embodiment, the same members are denoted by the same reference signs and repeated description is omitted.

According to the above configuration, the clearance formed between the first and second coupling portions 37, 46 can be made smaller than when the inner surface of the second coupling portion 46 is shaped not to extend along the outer surface of the first coupling portion 37. In this way, the shielding performance of the female connector 12 and a female connector structure 10 can be further improved.

Fourth Embodiment

Figure 29:
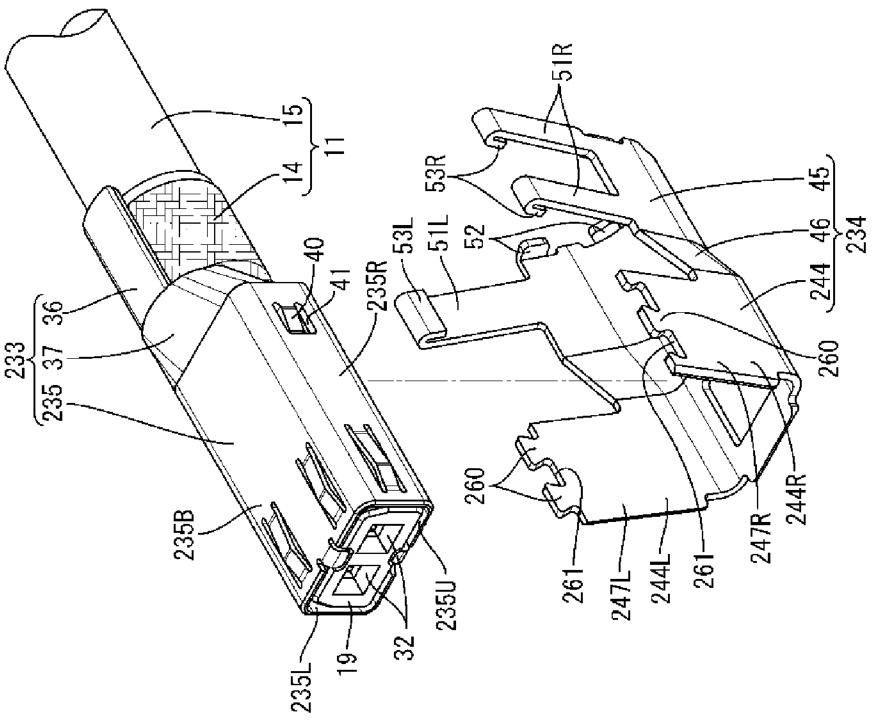
FIG. 29 is a perspective view showing a step of connecting first and second outer conductors in a female connector structure according to a fourth embodiment.
Figure 30:
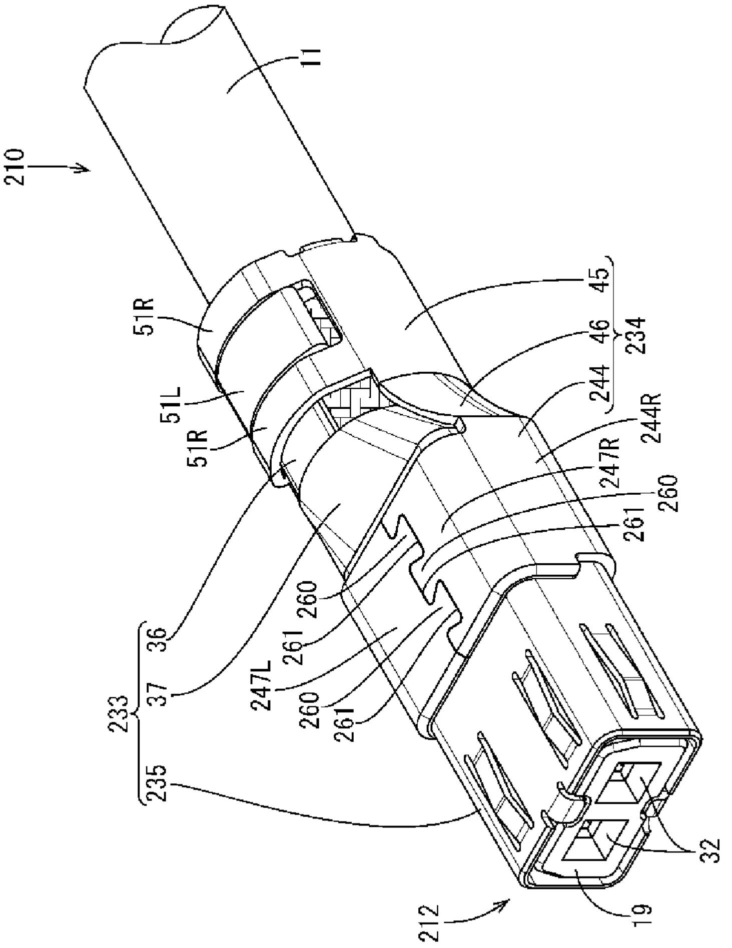
FIG. 30 is a perspective view showing the female connector structure according to the fourth embodiment.

Next, a fourth embodiment is described with reference to FIGS. 29 and 30. In a female connector structure 210 according to the fourth embodiment, a tubular portion 235 formed in a first outer conductor 233 of a female connector 212 is provided with no mark. A front crimping portion 244 provided in a second outer conductor 234 is provided with a left crimping piece 247L extending rightward from the lower end edge of a left side wall 244L and a right crimping piece 247R extending leftward from the lower end edge of a right side wall 244R. The right end edge of the left crimping piece 247L and the left end edge of the right crimping piece 237R butt against each other near a center of the tubular portion 235 in a lateral direction. Each of the right end edge of the left crimping piece 247L and the left end edge of the right crimping piece 247R is formed with substantially trapezoidal projection(s) 260 and substantially trapezoidal recess(es) 261, and the opening deformation of the tubular portion 235 is suppressed by fitting the projections 260 and the recesses 261.

Since components other than the above ones are substantially the same as in the first embodiment, the same members are denoted by the same reference signs and repeated description is omitted.

Other Embodiments

The technique disclosed in this specification is not limited to the above described and illustrated embodiments. For example, the following embodiments are also included in the technical scope of the technique disclosed in this specification.

(1) The outer periphery of the first coupling portion 37 may be completely covered by the second coupling portion 46.

(2) One, three or more coated wires 13 may be surrounded by the sheath 15 and the braided wire 14.

(3) An arbitrary material such as a metal foil or a resin tape having a metal foil adhered thereto can be appropriately selected for a shield layer without being limited to the braided wire 14.

LIST OF REFERENCE NUMERALS

10, 210: female connector structure (example of connector structure)
11: shielded cable
12, 212: female connector (example of connector)
13: coated wire
14: braided wire (example of shield portion)
15: sheath
16: core
17: insulation coating
18: female terminal (example of inner conductor)
19: dielectric
20: outer conductor
21: insulation barrel
22: wire barrel
23: connection tube portion
24: resilient contact piece
25: clip
26: crimping piece
27: sleeve
28: lower dielectric
29: upper dielectric
30: lock claw
31: lock receiving portion
32: cavity
33: first outer conductor
34: second outer conductor
35: tubular portion
35B: bottom wall
35L: left side wall
35R: right side wall
35U: upper wall
35UL: left half
35UR: right half
36: connection plate portion
37: first coupling portion
38: projection
39: recess
40: locking piece
41: through hole
42: locking recess
43: mark
44: front crimping portion (example of tube crimping portion)
44L: left side wall
44R: right side wall
44U: upper wall
45: rear crimping portion (example of shield crimping portion)
46: second coupling portion
47L: left crimping piece
47R: right crimping piece
48: clearance
49: locking hole
50: base plate portion
51L: left crimping piece

51R: right crimping piece
52: protrusion
53L: left locking portion
53R: right locking portion
110: male connector structure (example of connector structure)
112: male connector (example of connector)
118: male terminal (example of inner conductor)
119: dielectric
123: male tab
128: lower dielectric
129: upper dielectric
130: lock claw
131: lock receiving portion
132: cavity
133, 233: first outer conductor
134, 234: second outer conductor
135, 235: tubular portion
135B: bottom wall
135L: left side wall
135R: right side wall
135U: upper wall
135UL: left half
135UR: right half
136: connection plate portion
138: projection
139: recess
140B: rear locking piece
140F: front locking piece
141B: rear through hole
141F: front through hole
142B: rear locking recess
142F: front locking recess
143L: lower mark
143U: upper mark
144, 244: front crimping portion (example of tube crimping portion)
144B: bottom wall
144L, 244L: left side wall
144R, 244R: right side wall
144U: upper wall
147L, 247L: left crimping piece
147R, 247R: right crimping piece
145: rear crimping portion (example of shield crimping portion)
146: second coupling portion
148: clearance
149: locking hole
160: recess
260: projection
261: recess

What is claimed is:

1. A connector to be connected to an end part of such a shielded cable that an outer periphery of a coated wire including a core and an insulation coating surrounding an outer periphery of the core is surrounded by a shield portion, comprising:

an inner conductor to be connected to the core;

an insulating dielectric configured to surround the inner conductor;

a first outer conductor including a tubular portion configured to surround an entirety of an outer periphery of the dielectric, a connection plate portion to be overlapped on the shield portion and a first coupling portion coupling the tubular portion and the connection plate portion; and a second outer conductor including a shield crimping portion to be crimped to the shield portion and the connection plate portion from outside the shield portion and the connection plate portion, a tube crimping portion to be crimped to an entirety of an outer periphery of the tubular portion from outside the tubular portion and a second coupling portion coupling the shield crimping portion and the tube crimping portion, wherein:

the first coupling portion has a curved surface shape convex in one direction intersecting a longitudinal direction of the shielded cable when viewed from a side of the shield portion along the longitudinal direction, the second coupling portion has a curved surface shape convex in a direction opposite to the one direction when viewed from the side of the shield portion along the longitudinal direction, and the outer periphery of the core is surrounded by the first and second coupling portions with a part of the second coupling portion near an end part in the one direction overlapped on a part of the first coupling portion near an end part in the opposite direction from outside in a radial direction of the shielded cable.

2. The connector according to claim 1, wherein an inner surface of the second coupling portion is formed along an outer surface of the first coupling portion in a part where the second coupling portion is overlapped on the outside of the first coupling portion.

3. The connector according to claim 1, wherein an inner surface of the second coupling portion is in close contact with an outer surface of the first coupling portion in a part where the second coupling portion is overlapped on the outside of the first coupling portion.

4. A connector structure, comprising:

a shielded cable configured such that an outer periphery of a coated wire including a core and an insulation coating surrounding an outer periphery of the core is surrounded by a shield portion;

an inner conductor to be connected to the core exposed from an end part of the shielded cable;

an insulating dielectric configured to surround the inner conductor;

a first outer conductor including a tubular portion configured to surround an entirety of an outer periphery of the dielectric, a connection plate portion to be overlapped on the shield portion and a first coupling portion coupling the tubular portion and the connection plate portion; and a second outer conductor including a shield crimping portion to be crimped to the shield portion and the connection plate portion from outside the shield portion and the connection plate portion, a tube crimping portion to be crimped to an entirety of an outer periphery of the tubular portion from outside the tubular portion and a second coupling portion coupling the shield crimping portion and the tube crimping portion, wherein:

the first coupling portion has a curved surface shape convex in one direction intersecting a longitudinal direction of the shielded cable when viewed from a side of the shield portion along the longitudinal direction, the second coupling portion has a curved surface shape convex in a direction opposite to the one direction when viewed from the side of the shield portion along the longitudinal direction, and the outer periphery of the core is surrounded by the first and second coupling portions with a part of the second coupling portion near an end part in the one direction overlapped on a part of the first coupling portion near an end part in the opposite direction from outside in a radial direction of the shielded cable.

5. The connector structure according to claim 4, wherein an inner surface of the second coupling portion is formed along an outer surface of the first coupling portion in a part where the second coupling portion is overlapped on the outside of the first coupling portion.

6. The connector structure according to claim 4, wherein an inner surface of the second coupling portion is in close contact with an outer surface of the first coupling portion in a part where the second coupling portion is overlapped on the outside of the first coupling portion.

7. The connector according to claim 1, wherein the tubular portion of the first outer conductor is in a form of a rectangular tube.

8. The connector structure according to claim 4, wherein the tubular portion of the first outer conductor is in a form of a rectangular tube.

9. The connector according to claim 1, wherein the shield crimping portion includes a base plate portion extending rearward from a rear end edge of the second coupling portion, right crimping pieces extending downward from a right end edge of the base plate portion, and a left crimping piece extending downward from a left end edge of the base plate portion.

10. The connector according to claim 9, wherein a right locking portion is formed on a tip part of each of the right crimping pieces by folding the tip part of each of the right crimping pieces toward the shield portion, a left locking portion is formed on a tip part of the left crimping piece by folding the tip part of the left crimping piece toward the shield portion, and with the shield crimping portion crimped to the shield portion and the connection plate portion, the right locking portion is in contact with a left side edge of the connection plate portion in a direction along the radial direction of the shielded cable and the left locking portion is in contact with a right side edge of the connection plate portion in the direction along the radial direction of the shielded cable.

* * * * *